(12) United States Patent
Reese

(10) Patent No.: US 10,778,611 B2
(45) Date of Patent: Sep. 15, 2020

(54) TECHNIQUES FOR PROVIDING CONNECTIONS TO SERVICES IN A NETWORK ENVIRONMENT

(71) Applicant: salesforce.com, inc., San Francisco, CA (US)

(72) Inventor: David Byrne Reese, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/211,508

(22) Filed: Dec. 6, 2018

(65) Prior Publication Data

US 2019/0363996 A1    Nov. 28, 2019

Related U.S. Application Data

(63) Continuation of application No. 14/226,381, filed on Mar. 26, 2014, now Pat. No. 10,178,050, which is a continuation of application No. 12/858,146, filed on Aug. 17, 2010, now Pat. No. 8,725,892, which is a continuation of application No. 10/849,602, filed on May 19, 2004, now Pat. No. 7,802,007.

(51) Int. Cl.
*G06F 13/00*  (2006.01)
*H04L 12/937* (2013.01)
*G06Q 10/10*  (2012.01)

(52) U.S. Cl.
CPC .......... *H04L 49/253* (2013.01); *G06Q 10/10* (2013.01)

(58) Field of Classification Search
CPC ... G06Q 10/10; H04L 49/253; H04L 12/2497; H04L 41/0246; H04L 29/06823; H04L 29/06829; H04L 63/101

USPC ......... 709/232, 230, 229, 217–219
See application file for complete search history.

(56) References Cited

U.S. PATENT DOCUMENTS

| | | |
|---|---|---|
| 5,222,234 A | 6/1993 | Wang et al. |
| 5,255,389 A | 10/1993 | Wang |
| 5,333,312 A | 7/1994 | Wang |

(Continued)

FOREIGN PATENT DOCUMENTS

WO    WO 00/46732    8/2000

OTHER PUBLICATIONS

U.S. Office Action dated Mar. 26, 2008 issued in U.S. Appl. No. 10/742,513.

(Continued)

*Primary Examiner* — Kenneth R Coulter
(74) *Attorney, Agent, or Firm* — Weaver Austin Villeneuve & Sampson LLP

(57) ABSTRACT

Methods and apparatus for mediating user access to services over a network are described. Access is provided by a service network host to a plurality of connectors providing access to a plurality of services over the network. The services are provided by entities independent from the service network host. The connectors including a first connector are configured to communicate with a first service using a first format to retrieve or modify data associated with the first service. The first connector is further configured to identify one or more methods or data fields of the first service. The service network host is further configured to provide, to a computer associated with a user over the network, one or more directions for using the first connector to display and/or modify data from the first service over the network.

20 Claims, 11 Drawing Sheets

(56) References Cited

U.S. PATENT DOCUMENTS

| | | | |
|---|---|---|---|
| 5,446,903 | A | 8/1995 | Abraham et al. |
| 5,448,730 | A | 9/1995 | Bakita et al. |
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,724,556 | A | 3/1998 | Souder et al. |
| 5,734,837 | A | 3/1998 | Flores et al. |
| 5,761,419 | A | 6/1998 | Schwartz et al. |
| 5,774,668 | A | 6/1998 | Choquier et al. |
| 5,819,038 | A | 10/1998 | Carleton et al. |
| 5,821,937 | A | 10/1998 | Tonelli et al. |
| 5,826,017 | A | 10/1998 | Holzmann |
| 5,831,610 | A | 11/1998 | Tonelli et al. |
| 5,850,518 | A | 12/1998 | Northrup |
| 5,873,096 | A | 2/1999 | Lim et al. |
| 5,917,489 | A | 6/1999 | Thurlow et al. |
| 5,918,159 | A | 6/1999 | Fomukong et al. |
| 5,963,953 | A | 10/1999 | Cram et al. |
| 5,983,227 | A | 11/1999 | Nazem et al. |
| 6,091,714 | A | 7/2000 | Sensel et al. |
| 6,092,083 | A | 7/2000 | Brodersen et al. |
| 6,115,690 | A | 9/2000 | Wong |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,184,823 | B1 | 2/2001 | Smith et al. |
| 6,189,011 | B1 | 2/2001 | Lim et al. |
| 6,216,130 | B1 | 4/2001 | Hougaard et al. |
| 6,216,133 | B1 | 4/2001 | Masthoff |
| 6,216,135 | B1 | 4/2001 | Brodersen et al. |
| 6,233,617 | B1 | 5/2001 | Rothwein et al. |
| 6,236,978 | B1 | 5/2001 | Tuzhilin |
| 6,243,747 | B1 | 6/2001 | Lewis et al. |
| 6,266,669 | B1 | 7/2001 | Brodersen et al. |
| 6,272,457 | B1 | 8/2001 | Ford et al. |
| 6,278,977 | B1 | 8/2001 | Agrawal et al. |
| 6,288,717 | B1 | 9/2001 | Dunkle |
| 6,289,382 | B1 | 9/2001 | Bowman/Amuah |
| 6,295,530 | B1 | 9/2001 | Ritchie et al. |
| 6,301,611 | B1 | 10/2001 | Matsumoto et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| 6,338,074 | B1 | 1/2002 | Poindexter et al. |
| 6,343,290 | B1 | 1/2002 | Cossins et al. |
| D454,139 | S | 3/2002 | Feldcamp et al. |
| 6,356,529 | B1 | 3/2002 | Zarom |
| 6,367,077 | B1 | 4/2002 | Brodersen et al. |
| 6,393,605 | B1 | 5/2002 | Loomans |
| 6,397,254 | B1 | 5/2002 | Northrup |
| 6,405,220 | B1 | 6/2002 | Brodersen et al. |
| 6,411,949 | B1 | 6/2002 | Schaffer |
| 6,421,705 | B1 | 7/2002 | Northrup |
| 6,434,550 | B1 | 8/2002 | Warner et al. |
| 6,446,069 | B1 | 9/2002 | Yaung et al. |
| 6,446,089 | B1 | 9/2002 | Brodersen et al. |
| 6,449,634 | B1 | 9/2002 | Capiel |
| 6,473,770 | B1 | 10/2002 | Livshutz et al. |
| 6,529,489 | B1 | 3/2003 | Kikuchi et al. |
| 6,535,909 | B1 | 3/2003 | Rust |
| 6,546,413 | B1 | 4/2003 | Northrup |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec et al. |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,671,713 | B2 | 12/2003 | Northrup |
| 6,671,746 | B1 | 12/2003 | Northrup |
| 6,684,438 | B2 | 2/2004 | Brodersen et al. |
| 6,711,565 | B1 | 3/2004 | Subramaniam et al. |
| 6,721,747 | B2 | 4/2004 | Lipkin |
| 6,724,399 | B1 | 4/2004 | Katchour et al. |
| 6,725,445 | B1 | 4/2004 | Leymann et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,751,657 | B1 | 6/2004 | Zothner |
| 6,754,681 | B2 | 6/2004 | Brodersen et al. |
| 6,757,729 | B1 | 6/2004 | Devarakonda et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,772,229 | B1 | 8/2004 | Achacoso et al. |
| 6,775,704 | B1 | 8/2004 | Watson et al. |
| 6,782,383 | B2 | 8/2004 | Subramaniam et al. |
| 6,804,330 | B1 | 10/2004 | Jones et al. |
| 6,823,522 | B1 | 11/2004 | Lamb |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,893 | B2 | 2/2005 | Lipkin et al. |
| 6,850,895 | B2 | 2/2005 | Brodersen et al. |
| 6,850,949 | B2 | 2/2005 | Warner et al. |
| 6,868,143 | B1 | 3/2005 | Menon et al. |
| 6,871,231 | B2 | 3/2005 | Morris |
| 6,874,011 | B1 | 3/2005 | Spielman et al. |
| 6,885,736 | B2 | 4/2005 | Uppaluru |
| 6,892,376 | B2 | 5/2005 | McDonald et al. |
| 6,907,566 | B1 | 6/2005 | McElfresh et al. |
| 6,925,595 | B1 | 8/2005 | Whitledge et al. |
| 6,957,199 | B1 | 10/2005 | Fisher |
| 6,988,274 | B2 | 1/2006 | Machin et al. |
| 7,024,669 | B1 | 4/2006 | Leymann et al. |
| 7,027,997 | B1 | 4/2006 | Robinson et al. |
| 7,047,488 | B2 * | 5/2006 | Ingersoll ............... G06F 40/154 715/235 |
| 7,062,502 | B1 | 6/2006 | Kesler |
| 7,065,493 | B1 | 6/2006 | Homsi |
| 7,069,231 | B1 | 6/2006 | Cinarkaya et al. |
| 7,069,497 | B1 | 6/2006 | Desai |
| 7,072,983 | B1 | 7/2006 | Kanai et al. |
| 7,082,532 | B1 | 7/2006 | Vick et al. |
| 7,100,111 | B2 | 8/2006 | McElfresh et al. |
| 7,100,195 | B1 | 8/2006 | Underwood |
| 7,107,445 | B2 | 9/2006 | Trapp et al. |
| 7,181,758 | B1 | 2/2007 | Chan |
| 7,212,621 | B1 | 5/2007 | Wallenius et al. |
| 7,251,666 | B2 | 7/2007 | Morinville |
| 7,254,614 | B2 | 8/2007 | Mulligan et al. |
| 7,269,590 | B2 | 9/2007 | Hull et al. |
| 7,289,976 | B2 | 10/2007 | Kihneman et al. |
| 7,296,061 | B2 | 11/2007 | Martinez et al. |
| 7,305,454 | B2 | 12/2007 | Reese et al. |
| 7,340,411 | B2 | 3/2008 | Cook |
| 7,340,508 | B1 | 3/2008 | Kasi et al. |
| 7,356,482 | B2 | 4/2008 | Frankland et al. |
| 7,373,310 | B1 | 5/2008 | Homsi |
| 7,373,599 | B2 | 5/2008 | McElfresh et al. |
| 7,401,094 | B1 | 7/2008 | Kesler |
| 7,406,501 | B2 | 7/2008 | Szeto et al. |
| 7,412,399 | B1 | 8/2008 | Racca et al. |
| 7,412,455 | B2 | 8/2008 | Dillon |
| 7,448,046 | B2 | 11/2008 | Navani et al. |
| 7,451,432 | B2 | 11/2008 | Shukla et al. |
| 7,454,509 | B2 | 11/2008 | Boulter et al. |
| 7,454,750 | B2 | 11/2008 | Fitts et al. |
| 7,464,366 | B2 | 12/2008 | Shukla et al. |
| 7,508,789 | B2 | 3/2009 | Chan |
| 7,516,191 | B2 | 4/2009 | Brouk et al. |
| 7,574,511 | B2 | 8/2009 | Pujol et al. |
| 7,577,953 | B1 | 8/2009 | Verego et al. |

(56) References Cited

U.S. PATENT DOCUMENTS

| | | |
|---|---|---|
| 7,590,685 B2 | 9/2009 | Palmeri et al. |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,644,170 B2 | 1/2010 | Clarke et al. |
| 7,653,566 B2 | 1/2010 | Kim et al. |
| 7,668,861 B2 | 2/2010 | Steven |
| 7,689,430 B2 | 3/2010 | Fremantle et al. |
| 7,689,709 B2 * | 3/2010 | Surma .................... G06F 9/546 709/236 |
| 7,689,711 B2 | 3/2010 | Brouk et al. |
| 7,698,160 B2 | 4/2010 | Beaven et al. |
| 7,703,008 B2 * | 4/2010 | Ingersoll ............... G06F 40/197 715/234 |
| 7,711,694 B2 | 5/2010 | Moore |
| 7,725,605 B2 | 5/2010 | Palmeri et al. |
| 7,730,478 B2 | 6/2010 | Weissman |
| 7,739,351 B2 | 6/2010 | Shkvarchuk et al. |
| 7,747,648 B1 | 6/2010 | Kraft et al. |
| 7,766,324 B2 | 8/2010 | Tamura et al. |
| 7,779,039 B2 | 8/2010 | Weissman et al. |
| 7,779,475 B2 | 8/2010 | Jakobson et al. |
| 7,783,725 B2 * | 8/2010 | Chiang ................... G06F 40/14 709/219 |
| 7,788,399 B2 | 8/2010 | Brouk et al. |
| 7,802,007 B2 | 9/2010 | Reese |
| 7,827,208 B2 | 11/2010 | Bosworth et al. |
| 7,831,693 B2 | 11/2010 | Lai |
| 7,853,643 B1 | 12/2010 | Martinez et al. |
| 7,853,881 B1 | 12/2010 | Aly Assal et al. |
| 7,890,544 B2 | 2/2011 | Swartz et al. |
| 7,904,882 B2 | 3/2011 | Hinks |
| 7,933,290 B2 | 4/2011 | Aholainen |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,027,922 B2 | 9/2011 | Lee |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,082,491 B1 | 12/2011 | Abdelaziz et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,271,541 B2 | 9/2012 | Mohan et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,650,320 B1 | 2/2014 | Merrick et al. |
| 8,683,321 B2 * | 3/2014 | Ingersoll ............... G06F 40/197 715/234 |
| 8,725,892 B2 | 5/2014 | Reese |
| 8,775,654 B2 | 7/2014 | Shkvarchuk et al. |
| 9,223,480 B2 | 12/2015 | Bhandarkar et al. |
| 9,244,599 B2 | 1/2016 | Bhandarkar et al. |
| 9,645,712 B2 | 5/2017 | Bhandarkar et al. |
| 9,792,002 B2 | 10/2017 | Bhandarkar et al. |
| 9,916,549 B2 | 3/2018 | Hinks |
| 10,178,050 B2 | 1/2019 | Reese |
| 10,516,700 B2 | 12/2019 | Shkvarchuk et al. |
| 2001/0007976 A1 | 7/2001 | Thompson et al. |
| 2001/0044738 A1 | 11/2001 | Elkin et al. |
| 2001/0044791 A1 | 11/2001 | Richter et al. |
| 2002/0040312 A1 | 4/2002 | Dhar et al. |
| 2002/0040339 A1 | 4/2002 | Dhar et al. |
| 2002/0059114 A1 | 5/2002 | Cockrill et al. |
| 2002/0064267 A1 | 5/2002 | Martin et al. |
| 2002/0065701 A1 | 5/2002 | Kim et al. |
| 2002/0072951 A1 | 6/2002 | Lee et al. |
| 2002/0073080 A1 | 6/2002 | Lipkin |
| 2002/0082892 A1 | 6/2002 | Raffel et al. |
| 2002/0091533 A1 | 7/2002 | Ims et al. |
| 2002/0103878 A1 | 8/2002 | Moncibais |
| 2002/0103881 A1 | 8/2002 | Granade et al. |
| 2002/0116454 A1 | 8/2002 | Dyla et al. |
| 2002/0129352 A1 | 9/2002 | Brodersen et al. |
| 2002/0138577 A1 | 9/2002 | Teng et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0033191 A1 | 2/2003 | Davies et al. |
| 2003/0050800 A1 | 3/2003 | Brandt et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0078957 A1 | 4/2003 | Cheeniyil et al. |
| 2003/0079047 A1 | 4/2003 | Fitts et al. |
| 2003/0115179 A1 | 6/2003 | Prabakaran et al. |
| 2003/0120675 A1 | 6/2003 | Stauber et al. |
| 2003/0126001 A1 | 7/2003 | Northcutt et al. |
| 2003/0144860 A1 | 7/2003 | Casati et al. |
| 2003/0144894 A1 | 7/2003 | Robertson et al. |
| 2003/0149744 A1 | 8/2003 | Bierre et al. |
| 2003/0151633 A1 | 8/2003 | George et al. |
| 2003/0159136 A1 | 8/2003 | Huang et al. |
| 2003/0187676 A1 | 10/2003 | Hack et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0003084 A1 | 1/2004 | Malik et al. |
| 2004/0010489 A1 | 1/2004 | Rio et al. |
| 2004/0015981 A1 | 1/2004 | Coker et al. |
| 2004/0019696 A1 | 1/2004 | Scott et al. |
| 2004/0025048 A1 | 2/2004 | Porcari et al. |
| 2004/0025117 A1 * | 2/2004 | Ingersoll ............... G06F 40/154 715/234 |
| 2004/0027388 A1 | 2/2004 | Berg et al. |
| 2004/0054690 A1 | 3/2004 | Hillerbrand et al. |
| 2004/0068728 A1 | 4/2004 | Blevins |
| 2004/0098154 A1 | 5/2004 | McCarthy |
| 2004/0103014 A1 | 5/2004 | Teegan et al. |
| 2004/0117199 A1 | 6/2004 | Fremantle et al. |
| 2004/0117358 A1 | 6/2004 | von Kaenel et al. |
| 2004/0117371 A1 | 6/2004 | Bhide et al. |
| 2004/0117428 A1 * | 6/2004 | Surma .................... G06F 9/546 709/200 |
| 2004/0122853 A1 | 6/2004 | Moore |
| 2004/0128001 A1 | 7/2004 | Levin et al. |
| 2004/0162741 A1 | 8/2004 | Flaxer et al. |
| 2004/0162918 A1 | 8/2004 | Freidman et al. |
| 2004/0167834 A1 | 8/2004 | Koskinen et al. |
| 2004/0167986 A1 | 8/2004 | Gilfix et al. |
| 2004/0176988 A1 | 9/2004 | Boughannam |
| 2004/0186860 A1 | 9/2004 | Lee et al. |
| 2004/0189698 A1 | 9/2004 | Bokish |
| 2004/0193510 A1 | 9/2004 | Catahan et al. |
| 2004/0193606 A1 | 9/2004 | Arai et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |

(56) References Cited

U.S. PATENT DOCUMENTS

| | | |
|---|---|---|
| 2004/0205075 A1 | 10/2004 | LaTurner et al. |
| 2004/0205216 A1 | 10/2004 | Ballinger et al. |
| 2004/0215721 A1 | 10/2004 | Szeto et al. |
| 2004/0249854 A1 | 12/2004 | Barnes-Leon et al. |
| 2004/0254934 A1 | 12/2004 | Ho et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0004893 A1 | 1/2005 | Sangroniz |
| 2005/0015619 A1 | 1/2005 | Lee |
| 2005/0027585 A1 | 2/2005 | Wodtke et al. |
| 2005/0039040 A1 | 2/2005 | Ransom et al. |
| 2005/0044197 A1 | 2/2005 | Lai |
| 2005/0050555 A1 | 3/2005 | Exley et al. |
| 2005/0076049 A1 | 4/2005 | Qubti et al. |
| 2005/0086360 A1 | 4/2005 | Mamou et al. |
| 2005/0086594 A1 | 4/2005 | Schlimmer et al. |
| 2005/0091098 A1 | 4/2005 | Brodersen et al. |
| 2005/0108169 A1 | 5/2005 | Balasubramanian et al. |
| 2005/0119926 A1 | 6/2005 | Turetsky et al. |
| 2005/0131941 A1 | 6/2005 | Dettinger et al. |
| 2005/0138031 A1 | 6/2005 | Wefers |
| 2005/0138210 A1 | 6/2005 | Shkvarchuk et al. |
| 2005/0165822 A1 | 7/2005 | Yeung et al. |
| 2005/0171930 A1 | 8/2005 | Arning et al. |
| 2005/0198121 A1 | 9/2005 | Daniels et al. |
| 2005/0204048 A1 | 9/2005 | Pujol et al. |
| 2005/0216555 A1 | 9/2005 | English et al. |
| 2005/0220139 A1 | 10/2005 | Aholainen |
| 2005/0223009 A1 | 10/2005 | Powers et al. |
| 2005/0228863 A1 | 10/2005 | Palmeri et al. |
| 2005/0232283 A1 | 10/2005 | Moyer et al. |
| 2005/0234928 A1 | 10/2005 | Shkvarchuk et al. |
| 2005/0234964 A1 | 10/2005 | Batra et al. |
| 2005/0256934 A1 | 11/2005 | Motoyama |
| 2006/0015353 A1 | 1/2006 | Reese |
| 2006/0015499 A1 | 1/2006 | Clissold et al. |
| 2006/0020641 A1 | 1/2006 | Walsch et al. |
| 2006/0021019 A1 | 1/2006 | Hinton et al. |
| 2006/0031194 A1 | 2/2006 | Ghazaleh |
| 2006/0059423 A1 | 3/2006 | Lehmann et al. |
| 2006/0069605 A1 | 3/2006 | Hatoun |
| 2006/0069717 A1 | 3/2006 | Mamou et al. |
| 2006/0074703 A1 | 4/2006 | Bhandarkar |
| 2006/0074915 A1 | 4/2006 | Bhandarkar |
| 2006/0074933 A1 | 4/2006 | Barac et al. |
| 2006/0074969 A1 | 4/2006 | Barac et al. |
| 2006/0085473 A1 | 4/2006 | Thormaehlen et al. |
| 2006/0143591 A1 | 6/2006 | Hilerio et al. |
| 2006/0150095 A1* | 7/2006 | Ingersoll .............. G06F 40/154 715/239 |
| 2006/0161549 A1 | 7/2006 | Bartkowiak et al. |
| 2006/0173951 A1 | 8/2006 | Arteaga et al. |
| 2007/0005777 A1 | 1/2007 | Fremantle et al. |
| 2007/0112976 A1 | 5/2007 | Anders et al. |
| 2007/0129979 A1 | 6/2007 | Kumagai et al. |
| 2007/0136294 A1 | 6/2007 | Morinville |
| 2007/0136357 A1 | 6/2007 | van Wyk et al. |
| 2007/0143736 A1 | 6/2007 | Moriarty et al. |
| 2007/0174342 A1 | 7/2007 | Maeda et al. |
| 2007/0208606 A1 | 9/2007 | MacKay et al. |
| 2008/0114475 A1 | 5/2008 | Wiersema |
| 2008/0196007 A1* | 8/2008 | Chiang .................. G06F 40/14 717/114 |
| 2008/0249972 A1 | 10/2008 | Dillon |
| 2008/0306806 A1 | 12/2008 | Van Wyk et al. |
| 2008/0307392 A1 | 12/2008 | Racca et al. |
| 2008/0313003 A1 | 12/2008 | Racca et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0187453 A1 | 7/2009 | Dill et al. |
| 2010/0041380 A1 | 2/2010 | Hewes et al. |
| 2011/0060842 A1 | 3/2011 | Reese |
| 2011/0218958 A1 | 9/2011 | Warshaysky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0254291 A1 | 10/2012 | Feldman et al. |
| 2012/0290407 A1 | 11/2012 | Hubbard et al. |
| 2013/0047090 A1 | 2/2013 | Bhandarkar et al. |
| 2013/0198645 A1 | 8/2013 | Bhandarkar et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0246933 A1 | 9/2013 | Bhandarkar et al. |
| 2013/0247216 A1 | 9/2013 | Cinarkaya et al. |
| 2014/0258549 A1 | 9/2014 | Reese et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2018/0020025 A1 | 1/2018 | Shkvarchuk et al. |

OTHER PUBLICATIONS

U.S. Final Office Action dated Apr. 16, 2010 issued in U.S. Appl. No. 10/742,513.
U.S. Office Action dated May 2, 2011 issued in U.S. Appl. No. 10/742,513.
U.S. Final Office Action dated Feb. 23, 2012 issued in U.S. Appl. No. 10/742,513.
U.S. Office Action dated Sep. 24, 2013 issued in U.S. Appl. No. 10/742,513.
U.S. Notice of Allowance dated Jan. 16, 2014 issued in U.S. Appl. No. 10/742,513.
U.S. Office Action dated Mar. 4, 2009 issued in U.S. Appl. No. 10/849,602.
U.S. Final Office Action dated Sep. 17, 2009 issued in U.S. Appl. No. 10/849,602.
U.S. Examiner Interview Summary dated Dec. 15, 2009 issued in U.S. Appl. No. 10/849,602.
U.S. Notice of Allowance dated May 6, 2010 issued in U.S. Appl. No. 10/849,602.
U.S. Miscellaneous Communication (Notice of Non-Compliant Information Disclosure Statement) dated Aug. 10, 2010 issued in U.S. Appl. No. 10/849,602.
U.S. Office Action dated Mar. 16, 2012 issued in U.S. Appl. No. 12/858,146.
U.S. Office Action dated Jan. 30, 2013 issued in U.S. Appl. No. 12/858,146.
U.S. Final Office Action dated Aug. 16, 2013 issued in U.S. Appl. No. 12/858,146.
U.S. Notice of Allowance dated Dec. 26, 2013 issued in U.S. Appl. No. 12/858,146.
U.S. Office Action dated Mar. 11, 2016 issued in U.S. Appl. No. 14/226,381.
U.S. Final Office Action dated Oct. 19, 2016 issued in U.S. Appl. No. 14/226,381.
U.S. Office Action dated Sep. 7, 2017 issued in U.S. Appl. No. 14/226,381.
U.S. Notice of Allowance dated Feb. 12, 2018 issued in U.S. Appl. No. 14/226,381.
U.S. Notice of Allowance dated May 10, 2018 issued in U.S. Appl. No. 14/226,381.
U.S. Notice of Allowance dated Aug. 31, 2018 issued in U.S. Appl. No. 14/226,381.
U.S. Final Office Action dated Oct. 19, 2017 issued in U.S. Appl. No. 14/949,505.
U.S. Office Action dated Apr. 27, 2018 issued in U.S. Appl. No. 14/949,505.
U.S. Final Office Action dated Oct. 4, 2018 issued in U.S. Appl. No. 14/949,505.
U.S. Office Action dated Feb. 7, 2019 issued in U.S. Appl. No. 14/949,505.

(56) References Cited

OTHER PUBLICATIONS

U.S. Office Action dated Aug. 31, 2009 issued in U.S. Appl. No. 11/021,716.
U.S. Examiner Interview Summary dated Dec. 2, 2009 issued in U.S. Appl. No. 11/021,716.
U.S. Final Office Action dated Mar. 4, 2010 issued in U.S. Appl. No. 11/021,716.
U.S. Office Action dated May 17, 2011 issued in U.S. Appl. No. 11/021,716.
U.S. Final Office Action dated Jan. 31, 2012 issued in U.S. Appl. No. 11/021,716.
U.S. Office Action dated Feb. 27, 2013 issued in U.S. Appl. No. 11/021,716.
U.S. Final Office Action dated Mar. 6, 2014 issued in U.S. Appl. No. 11/021,716.
U.S. Office Action dated Apr. 11, 2007 issued in U.S. Appl. No. 11/014,149.
U.S. Final Office Action dated Oct. 1, 2007 issued in U.S. Appl. No. 11/014,149.
U.S. Office Action dated May 23, 2008 issued in U.S. Appl. No. 11/014,149.
U.S. Examiner Interview Summary dated Oct. 8, 2008 issued in U.S. Appl. No. 11/014,149.
U.S. Final Office Action dated Dec. 17, 2008 issued in U.S. Appl. No. 11/014,149.
U.S. Examiner Interview Summary dated Mar. 9, 2009 issued in U.S. Appl. No. 11/014,149.
U.S. Office Action (Advisory Action) dated Mar. 23, 2009 issued in U.S. Appl. No. 11/014,149.
U.S. Office Action dated Jun. 17, 2009 issued in U.S. Appl. No. 11/014,149.
U.S. Examiner Interview Summary dated Sep. 11, 2009 issued in U.S. Appl. No. 11/014,149.
U.S. Final Office Action dated Dec. 8, 2009 issued in U.S. Appl. No. 11/014,149.
U.S. Examiner Interview Summary dated Mar. 18, 2010 issued in U.S. Appl. No. 11/014,149.
U.S. Office Action dated Apr. 20, 2010 issued in U.S. Appl. No. 11/014,149.
U.S. Final Office Action dated Aug. 20, 2010 issued in U.S. Appl. No. 11/014,149.
U.S. Notice of Non-Compliant Appeal Brief dated Sep. 20, 2011 issued in U.S. Appl. No. 11/014,149.
U.S. Notice of Non-Compliant Appeal Brief dated Dec. 8, 2011 issued in U.S. Appl. No. 11/014,149.
U.S. Examiner's Answer Before the Board of Patent Appeals and Interferences dated Jan. 18, 2012 issued in U.S. Appl. No. 11/014,149.
U.S. Patent Board Decision-Before the Patent Trial and Appeal Board dated May 31, 2016 issued in U.S. Appl. No. 11/014,149.
U.S. Notice of Allowance dated Aug. 9, 2016 issued in U.S. Appl. No. 11/014,149.
U.S. Notice of Allowance dated Aug. 26, 2016 issued in U.S. Appl. No. 11/014,149.
U.S. Notice of Allowance dated Dec. 23, 2016 issued in U.S. Appl. No. 11/014,149.
U.S. Office Action dated May 5, 2014 issued in U.S. Appl. No. 13/619,976.
U.S. Final Office Action dated Aug. 22, 2014 issued in U.S. Appl. No. 13/619,976.
U.S. Office Action dated May 12, 2015 issued in U.S. Appl. No. 13/619,976.
U.S. Final Office Action dated Oct. 16, 2015 issued in U.S. Appl. No. 13/619,976.
U.S. Office Action dated Feb. 3, 2016 issued in U.S. Appl. No. 13/619,976.
U.S. Final Office Action dated Aug. 8, 2016 issued in U.S. Appl. No. 13/619,976.
U.S. Office Action dated Jan. 12, 2017 issued in U.S. Appl. No. 13/619,976.
U.S. Notice of Allowance dated Jun. 8, 2017 issued in U.S. Appl. No. 13/619,976.
U.S. Office Action dated Apr. 9, 2015 issued in U.S. Appl. No. 13/802,396.
U.S. Notice of Allowance dated Sep. 15, 2015 issued in U.S. Appl. No. 13/802,396.
U.S. Office Action dated May 15, 2015 issued in U.S. Appl. No. 13/886,206.
U.S. Notice of Allowance dated Aug. 27, 2015 issued in U.S. Appl. No. 13/886,206.
Barton et al., (Dec. 2000) "SOAP Messages with Attachments, W3C Note, Dec. 11, 2000", Retrieved from the Internet: http://www.w3.org/TR/SOAP-attachments, [retrieved on Apr. 18, 2011], 9 pages.
CrossWeaveTM—Extending the Enterprise (2001), company overview downloaded from CrossWeave.com website at http://www.crossweave.com/company_overview.html; Retrieved from internet on Apr. 1, 2002, 1 page.
Fu, Michael C. (2001) "Simulation Optimization", Proceedings of the 2001 Winter Simulation Conference, pp. 53-61.
GlueCode: Our Mission and Vision (2002) downloaded from Gluecode.com website at URL:http://www.gluecode.com/company/mission_vision.html, p. 1 [Retrieved from internet on Apr. 1, 2002], 1 page.
Greef, Arthur (1998) "Partner Interface Process Technical Architecture," RosettaNet/PIP Technical Architecture.doc dated Apr. 1, 2002, pp. 1-12.
Harding et al. (Sep. 2002) "MIME-based Secure Peer-to-Peer Business Data Interchange over the Internet", Network Working Group, RFC:3335, Category: Standards Track pp. 1-28.
ipo.com—Venture Portfolio Company Profile (2002), downloaded from ipo.com website at http://www.ipo.com/venture/pcprofile.asp?p=IPO&pc=20323; Retrieved from internet on Apr. 1, 2002, 1 page.
Maria, Anu (1997) "Introduction to Modeling and Simulation", Proceedings of the 1997 Winter Simulation Conference, pp. 7-13.
Moberg, Dale and Drummond, Rik (2005) "Mime-Based Secure Peer-to-Peer Business Data Interchange Using HTTP, Applicability Statement 2 (AS2)"; Network Working Group, Request for Comments: 4130, Category: Standards Track, Copyright, The Internet Society, Jul. 2005, 47 pages.
Nichol et al., (Sep. 2002) "Re:Convert DIME to SoW/MIME", Retrieved from the Internet: http://www.mail-arvhive.com/soap-user@xml.apache.org/msg05811.html, [retrieved on Apr. 18, 2011], 3 pages.
Seppanen, Marvin S. (2000) "Developing Industrial Strength Simulation Models Using Visual Basic for Applications (VBA)" Proceedings of the 2000 Winter Simulation Conference, pp. 77-82.
Slam Dunk Networks (2000), Company overview and product guide downloaded from Slamdunknetworks.com website at http://www.slamdunknetworks.com; Retrieved from internet on Sep. 22, 2000, 15 pages.
Slam Dunk NetworksSM: A global Infrastructure for the Guaranteed Delivery of B2B Transactions over the Internet, Copyright 2000 Slam Dunk Networks, Inc., 19 pages.
Stross, Kenner (2000) "Managed B2B Infrastructure Technical Architecture," Jul. 31, 2000, TransactplusTM business quality internet, Transact Technical Architecture, pp. 1-14.
Takus, David A. (1997) "Arena® Software Tutorial" Proceedings of the 1997 Winter Simulation Conference, pp. 541-544.
Viquity Press Release (2000) "Viquity Demonstrates Power of Hub Technology in ebXML Proof-of-Concept," dated Dec. 12, 2000, downloaded from Viquity.com website at http://www.viquity.com/news_events/pr_detail.asp; Retrieved from internet on Apr. 1, 2002, 2 pages.
"Google Plus Users", Google+Ripples, Oct. 31, 2011 [retrieved on Feb. 21, 2012 from Internet at http://www.googleplusers.com/google-ripples.html], 3 pages.
U.S. Final Office Action dated Jul. 1, 2019 issued in U.S. Appl. No. 14/949,505.
U.S. Office Action dated Dec. 5, 2019 issued in U.S. Appl. No. 14/949,505.
U.S. Final Office Action dated Apr. 8, 2020 issued in U.S. Appl. No. 14/949,505.

* cited by examiner

TECHNIQUES FOR PROVIDING CONNECTIONS TO SERVICES IN A NETWORK ENVIRONMENT

PRIORITY DATA

This patent document is a continuation of and claims priority to commonly-assigned and co-pending U.S. patent application Ser. No. 14/226,381 (now U.S. Pat. No. 10,178, 050), entitled TECHNIQUES FOR PROVIDING CONNECTIONS TO SERVICES IN A NETWORK ENVIRONMENT, filed on Mar. 26, 2014, which is a continuation of U.S. patent application Ser. No. 12/858,146 (now U.S. Pat. No. 8,725,892), entitled TECHNIQUES FOR PROVIDING CONNECTIONS TO SERVICES IN A NETWORK ENVIRONMENT, filed on Aug. 17, 2010, which is a continuation of U.S. patent application Ser. No. 10/849,602 (now U.S. Pat. No. 7,802,007), entitled TECHNIQUES FOR PROVIDING CONNECTIONS TO SERVICES IN A NETWORK ENVIRONMENT, filed on May 19, 2004. Each of U.S. patent application Ser. No. 14/226,381, U.S. patent application Ser. No. 12/858,146 and U.S. patent application Ser. No. 10/849,602 is hereby incorporated by reference in its entirety and for all purposes.

BACKGROUND

The present invention relates to enabling interaction among a plurality of services in a network and, more specifically, providing connectors to facilitate such interaction.

The vast majority of application services today are provided according to a computing model which is characterized by several limitations. According to this model, a user wishing to access any of a number of application services employs a client machine (e.g., a desktop computer) to generate a request for a particular service. This is typically facilitated by a browser operating on client machine. The browser is an application which communicates via a network (e.g., a public or private LAN or WAN) with a server which manages access to the application services. What is typically viewed by the user is a page (e.g., an html page) which is generated by the server and delivered over the network for display in the user's browser.

The server in this model typically employs a three-tiered architecture to manage access to the associated application services. A portal layer governs display of information presented in the client's browser. An application server layer manages access to the application services on a high level, but because of the varied nature of the application services, an integration layer is required to normalize the communications with these services. That is, the integration layer, which is the primary focus of Enterprise Application Integration (EAI) and Business-to-Business (B2B) providers, facilitates connection with and communication among the application services themselves. Unfortunately, the great variety of application services and the highly individualized nature of EAI and B2B solutions coupled with the limitations of this computing model have made EAI and B2B economically impracticable approaches for many enterprises.

In conjunction with the proliferation of Web services there has been movement toward and open, standards-based approaches to platform interoperability using standards such as XML, SOAP, BPEL, WSDL, UDDI, etc. However, the problem of getting disparate platforms to interact is still largely solved using an ad hoc approach involving considerable expense on the part of any business wishing to take advantage of the services available on the Web as well as a considerable duplication of effort.

SUMMARY

According to the present invention, methods and apparatus for facilitating consumption of services via a services network are provided. According to a specific embodiment, access is provided to a services directory which identifies a plurality of services and at least one connector for facilitating consumption of each of the services via the network. Each connector is operable to mediate communication protocol and business policy differences between a first network end point associated with the corresponding service and a second network end point associated with a consumer of the service. For each of selected ones of the connectors, information accessible via the services directory is provided regarding how to use the connector to consume the corresponding service. For each of selected ones of the services, access to a connector design process is provided via the services directory. The connector design process is operable to facilitate creation of a new connector for the corresponding service, and to specify at least one business process for mediating the business policy differences.

According to another embodiment, a services network is provided for providing access to a plurality of services by a plurality of users having associated client machines. Each of the plurality of users is associated with one of a plurality of independent enterprises. The plurality of services are controlled by a plurality of independent service providers and employ a plurality of interfaces at least some of which are not directly interoperable. At least one data store has a first directory stored therein which maps an identity corresponding to each of the users to a policy framework which defines access policies relating to the services. The identity for each user identifies the associated enterprise. The at least one data store also has a second directory stored therein which identifies the plurality of services and at least one connector for facilitating consumption of each of the services via the network. Each connector is operable to mediate communication protocol and business policy differences between a first end point on the network associated with the corresponding service and a second end point on the network associated with a consumer of the service. At least one computing device is operable to connect with each of the client machines and each of the interfaces associated with the services, and to selectively facilitate interaction among client machines and the services with reference to the directory and the policy framework, thereby enabling the users associated with different ones of the enterprises to independently access the plurality of services using the services network. The at least one computing device is further operable to provide access to the second directory and, for each of selected ones of the connectors, provide information accessible via the second directory regarding how to use the connector to consume the corresponding service.

A further understanding of the nature and advantages of the present invention may be realized by reference to the remaining portions of the specification and the drawings.

BRIEF DESCRIPTION OF THE DRAWINGS

FIGS. 3-7, 9 and 10 are representations of graphical user interfaces for illustrating a process by which a user may discover and prepare to consume a service according to various embodiments of the invention.

DETAILED DESCRIPTION OF SPECIFIC EMBODIMENTS

Figure 1:
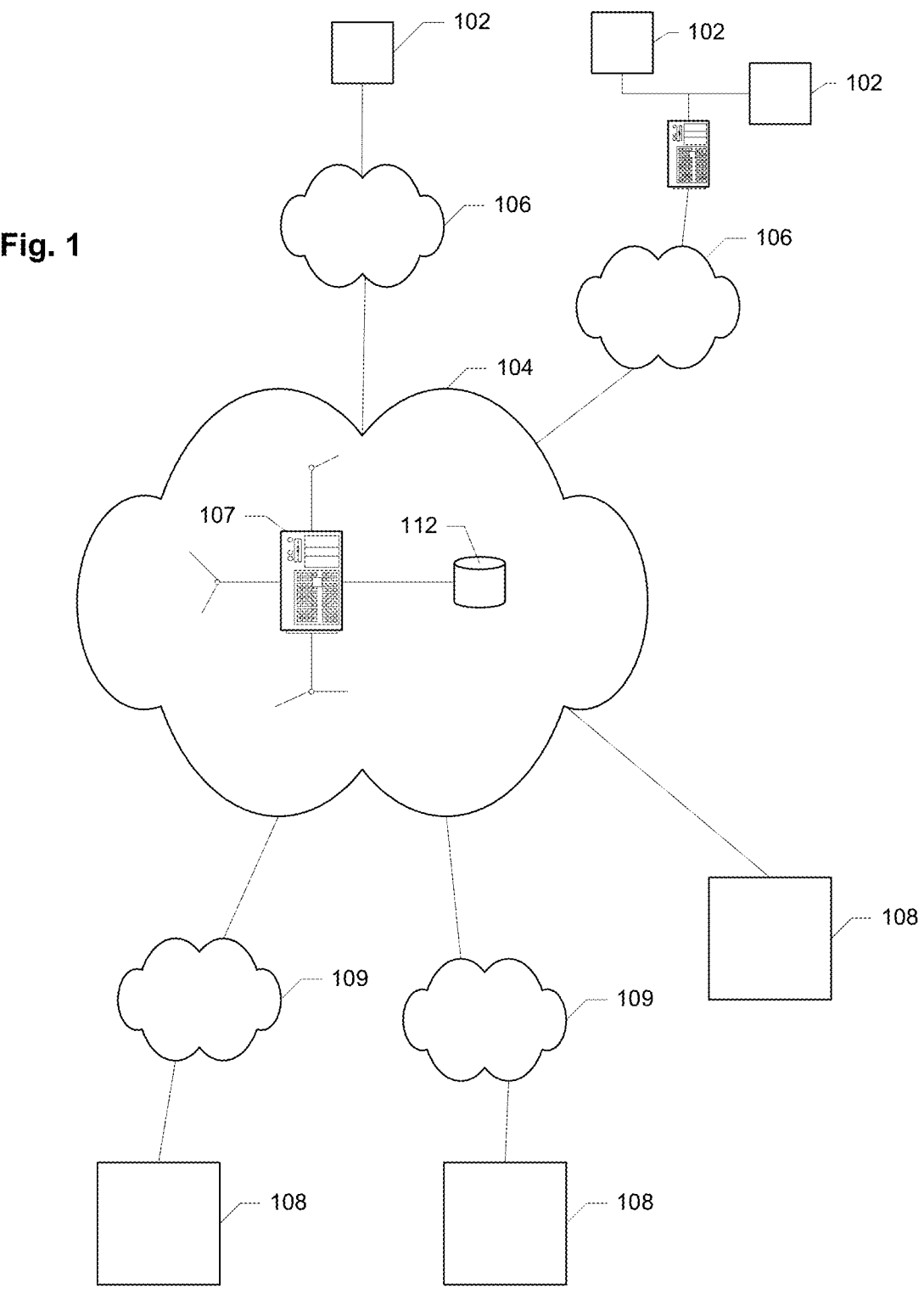
FIG. 1 is a simplified network diagram of a network environment in which embodiments of the present invention may be practiced.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Embodiments of the present invention are implemented in a services network which is a message platform having a loosely coupled, service oriented architecture (SOA). One of the main advantages of such an architecture is that it allows communication (e.g., the consumption of services) between network end points and processes to transcend technology or protocol mediation issues. A user or a "service" simply connects to the network and that one connection implicitly connects that user or service (at some level) to every other entity on the network.

As used herein, the term "service" may represent any computer application, process, entity, or device accessible to other applications, processes, entities, or devices through an interface such as an application programming interface (API), user interface, or Internet web user interface by any of a variety of protocols over a network within an entity or over the Internet. A service may also comprise multiple methods or applications on a single device or distributed across multiple devices.

According to various embodiments of the invention, a services network is provided which facilitates such interoperability using a wide variety of Web Services technologies and standards including, for example, SOAP, Web Services Description Language (WSDL), WS-Security, WS-Policy, and Business Process Execution Language (BPEL). The services network mediates the technology differences in data formats, communications protocols and business policies through a set of established and defined processes and policies.

In general, the term Web Services refers to a collection of technology standards which enable software applications of all types to communicate over a network. A Web Service typically facilitates a connection between two applications or services in which queries and responses are exchanged in XML over HTTP. More specifically, the term Web Services implies the implementation of a stack of specific, complementary standards.

Although not specifically tied to any transport protocol, Web services build on Internet connectivity and infrastructure to ensure nearly universal reach and support. In particular, Web services take advantage of HTTP, the same connection protocol used by Web servers and browsers. XML is a widely accepted format for exchanging data and its corresponding semantics. It is a fundamental building block for nearly every other layer in the Web Services stack. The Simple Object Access Protocol (SOAP) is a protocol for messaging between applications. It is based on XML and uses common Internet transport protocols like HTTP to carry its data. Web Services Description Language (WSDL) is an XML-based description of how to connect to and communicate with a particular Web service. A WSDL description abstracts a particular service's various connection and messaging protocols into a high-level bundle and forms a key element of the UDDI directory's service discovery model. Finally, Universal Description, Discovery, and Integration (UDDI) represents a set of protocols and a public directory for the registration and real-time lookup of Web services and other business processes. Various embodiments of the invention employ these and similar technologies.

Referring now to the exemplary diagram of FIG. 1, user platforms 102 (which may be part of an enterprise network) connect with a services network 104 via intervening networks 106. Services network 104 (e.g., using one or more computing devices such as server 107) facilitates access to selected ones of associated services 108 which may be sponsored or provided by network 104, or may comprise application services from third parties. These services may actually reside in the network or be connected via intervening networks (e.g., 109). As mentioned above, network 104 provides transparent connections to and interoperability with a wide variety of services and applications. Services network 104 has a directory capability (represented by database 112) which facilitates management of user identities (e.g., including role and group membership), application service identities, and policies which control which entities in the network can interact, and the manner in which they can interact. It should be noted that this directory capability is different from the services directory described below with which users can discover services in the network they wish to consume.

According to some implementations, the services network employs the directory to manage interactions among the services associated with many independent organizations, each with different access, authentication and encryption technologies. Differences in organizational security policies are handled using a policy framework which mediates the differences. According to some embodiments, each organization is able to configure and enforce access rights with multiple methods of authentication being supported.

According to some implementations, the services network supports WS-Policy, a flexible mechanism which enables enterprises to govern access to the services they have deployed on the services network. Such a mechanism may be employed, for example, to ensure that data are exchanged over encrypted connections to the services network, that user and service identities are verified (using the directory), and that access to a particular service is limited and controlled. According to various implementations, such capabilities are supported using industry standards such as, for example, SSL, IPSEC VPNs, and X.509 digital certificates. A policy framework which may be employed with various embodiments of the invention is described in U.S. Provisional Patent Application No. 60/511,573 for APPARATUS AND METHODS FOR POLICY MANAGEMENT WITHIN A COMPUTER NETWORK filed on Oct. 14, 2003, the entire disclosure of which is incorporated herein by reference for all purposes.

Thus, services network 104 provides a hosted, open, and shareable environment in which related and unrelated entities may provide and consume services using heterogeneous technology.

One approach to facilitating connection to and the consumption of services via such a services network involves separating the messaging function into two different aspects, message delivery and message posting. Message delivery relates to how messages are delivered from the network to a service and requires only that the service provider specify how the service expects to receive messages, i.e., the message format and communication protocol. Message posting relates to how, depending on its type, a service is required to post messages to the network and identify services to be consumed. By decoupling these two aspects of messaging, a consumer of a service need only be able to identify the service to be consumed for the network to successfully mediate the interaction.

In general, facilitating communication between two end points involves solving two problems. The first problem relates to resolving all of the technical connectivity issues to achieve data transfer between the two end points. The realm of this problem involves mediating the differences between authentication protocols, transport protocols, messaging protocols, etc. The above-described approach is highly successful within this realm.

The second problem relates to communicating and mediating differences between business policies associated with the two end points. Examples of such business policies might include imposing legal restrictions on the use of a service (e.g., through a terms of use agreement), execution of a contract, providing advance payment, executing credit checks, etc. Understanding the mappings between the business policies associated with two end point services is important to solving this problem.

An example may be instructive. Suppose a distributor wants access via a services network to a portion of a product catalog maintained by an independent manufacturer. Assume that the manufacturer's protocol is FTP and file format is CSV which is a comma delimited flat file format. Further assume that the distributor employs SOAP and communicates HTTP. The solution to the first problem described above, i.e., the mediation of the technical connectivity issues, can effect transfer of the CSV file to the distributor. However, an additional intervening mechanism which maps the CSV file to the SOAP format required by the distributor is also desirable.

The above-described messaging technique, in which message delivery and message posting are decoupled, may not, by itself, be sufficient for communicating and mediating business policy differences. That is, simply mediating the technical differences between two network end points may not be enough if the delivered payload of the messages is not intelligible to the receiver. Thus, some specific information may need to be provided to the consumer of a service relating to how a connection to a particular service is to be made over a protocol not natively supported by the service to which the consumer wishes to connect.

Therefore, according to the invention, a services network is provided which clearly communicates to the consumer of a particular service how to consume that service. According to one such embodiment, an intuitive directory is provided by which a user may discover a service as well as the technical requirements for consuming that service. Still more specifically, such a directory may provide access to processes which facilitate mapping between the business policies associated with two end points communicating via the services network. A discussion of the nature of such processes and how they may accessed and created follows.

In addition to facilitating interaction among addressable end points which map to actual services, the services network of the present invention also facilitates communication between the end points and addressable virtual or composite services or business processes operating within the network. Such business processes (which may comprise multiple, nested processes) are capable of orchestrating the movement of received messages among multiple end point services. One of the advantages of providing business processes which operate in the services network is that such processes may allow a service provider to deploy services to customers without deploying code to the service provider's data center. As will be discussed, other advantages may include shared visibility and independently verifiable audit trails to all participants in a process or data exchange.

Business processes may include any kind of business logic and are operable to make decisions based on the content of a message. For example, a business process may be operable to halt execution at a certain stage of a transaction to invoke some kind of human work flow, e.g., to solicit the approval of a specific individual. In another example, a business process might be configured to initiate a credit check where the amount of an invoice exceeds a specific monetary threshold. The decisions trees executed by such processes may be very simple or extremely complex.

Again, an example of a business process with a moderately complex decision tree may be instructive. A business process may exist in the services network which is capable of connecting to a service provider's catalog, selecting an item in the catalog, and creating an auction for that item on the service provider's behalf. The process may then monitor the auction and, when the auction closes, go to the service provider's inventory system and put the item on hold. The process may then connect to a payment service to effect issuance of a payment request to the auction buyer and, when the payment request is satisfied, connect with the service provider's inventory system to effect shipping of the item to the buyer. It should be understood that this is merely an example and that the nature and capabilities of such business processes which may be employed with various embodiments of the invention are virtually unlimited.

A service provider can create such business processes in the services network in any of a variety of ways using a wide variety of well known tools and techniques. For example, a representative of the service provider can log onto the network and specify the desired functionality of the process (i.e., the behavior of the decision tree) in some sort of development environment which results in the generation of an executable process. Alternatively, the service provider representative can provide an executable business process flow language file (e.g., a BPEL file) which is then executed in the network by a service corresponding to that file format. It should be understood that, according to various embodiments, business processes may be generated in a wide variety of ways. Therefore, the particular manner in which a business process is generated should not limit the scope of the invention.

According to a specific embodiment, the present invention provides a directory which facilitates access to and enables the customization or creation of connectors which facilitate consumption of specific services associated with end points in a service network by a user associated with one of the end points. These connectors employ business processes operating in the network which facilitate the mapping of business policies between the communicating end points. As used herein, the term "business policies" refers to any requirements associated with an end point which go beyond mediation of the technical connectivity issues associated with the facilitation of data transmission between two end points. Examples of business policies include, but are not limited to, contract mediation, security, encryption, authentication, identity, visibility, auditability policies, etc. Other examples include schematic transformation and semantic transformation (e.g., where part numbers in one system are mapped, correlated and transformed into part numbers of another system); the primary difference being that in one type of transformation the structure of the document is being changed, while in the other the underlying data of the document are being changed. An exemplary connector will now be described with reference to FIG. 2.

Figure 2:
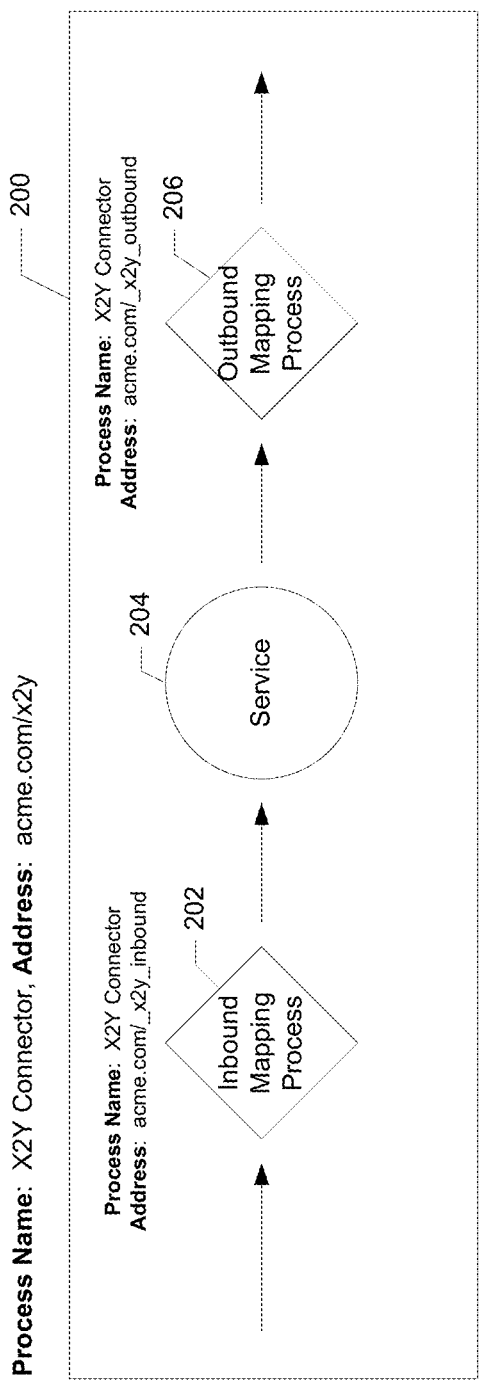
FIG. 2 is a simplified block diagram of a connector according to a specific embodiment of the invention.

According to a specific embodiment of the invention shown in FIG. 2, a connector 200 is an addressable business process (which may be a set of nested business processes) deployed on a hosted services network that is bound to a specific service on the network. Connector 200 serves as a "container" for an inbound mapping process 202, the service 204 to which the connector is bound, and (optionally) an outbound mapping process 206. As shown with respect to inbound process 202, each of the processes or services within connector 200 may comprise a number of processes or services (e.g., $S_A$, $S_B$ and $S_C$) which operate on the input to effect the desired mapping or transformation. The purpose of connector 200 is facilitating the connection of two disparate end point systems, i.e., one being associated with service 204 and the other being associated with the consumer (208) of the service. Each such connector runs in conjunction with the messaging processes within the network which mediate the technical differences between end points.

Inbound mapping process 202 receives a request from service consumer 208, applies some set of transformations which map the request to the format expected by service 204, and sends the transformed request to service 204 which then takes some action in response to the request. If a response is to be returned by service 204 to consumer 208, the response is received by outbound mapping process 206 which applies some set of transformations which map the response to the format expected by consumer 208, and sends the transformed response to the consumer. It should be understood that, while consumer 208 may represent a service associated with an end point as depicted in FIG. 2, it may also represent a service or process operating within the network. It should also be noted that any connector or any of the services or processes used to implement a connector may be newly created services or processes or preexisting services or processes accessed through the directory.

It should also be understood that the services network in which such connectors are deployed may be operable to bill users for the use of the connectors in a variety of ways. For example, an enterprise might be billed each time one of its members sends a message in the network which employs a particular connector. Alternatively, an enterprise might be billed for connector usage on a volumetric or calendar basis.

FIGS. 3 through 8 are screen shots illustrating a process by which a user, e.g., a developer associated with a service provider or enterprise, may discover and enable consumption of a specific service using an enhanced directory according to a specific embodiment of the invention. It should be noted that the depicted directory structure is merely exemplary and that many variations of directory structures may be employed to implement the invention. In the embodiment shown in FIG. 3, the directory (i.e., Public Directory) is organized into a hierarchy of categories of services, selection of one of which (e.g., Some Service Category) links to the page shown in FIG. 3 which lists subcategories within that category (i.e., Additional Categories) as well as a list of Services in the selected category. As will be understood, there may be many levels in such a hierarchy.

Each service listing includes the service name (e.g., htmail—Do It Yourself Email Marketing) along with a description of the service and the provider of the service. Also associated with each service is a list of connectors which tells the user at least some of the supported protocols (e.g., Synchronous SOAP|Asynchronous SOAP|FTP) for consumers of the service.

As a technical matter, any end point connected to the services network can address and send data to any other end point (assuming authorization to do so) without explicit reference to these protocols by virtue of the messaging technique underlying the network. However, as discussed above, without the proper mapping of business policies by an intervening business process on the network, the transfer of data between the end points may end up a meaningless exercise. Thus, even though the network supports connectivity between virtually any protocols, the directory provides explicit information for a subset of currently supported protocols. As will be seen, this information is a starting point for the user to set up consumption of a specific service in a way that ensures the meaningful transfer of information.

Figure 4:
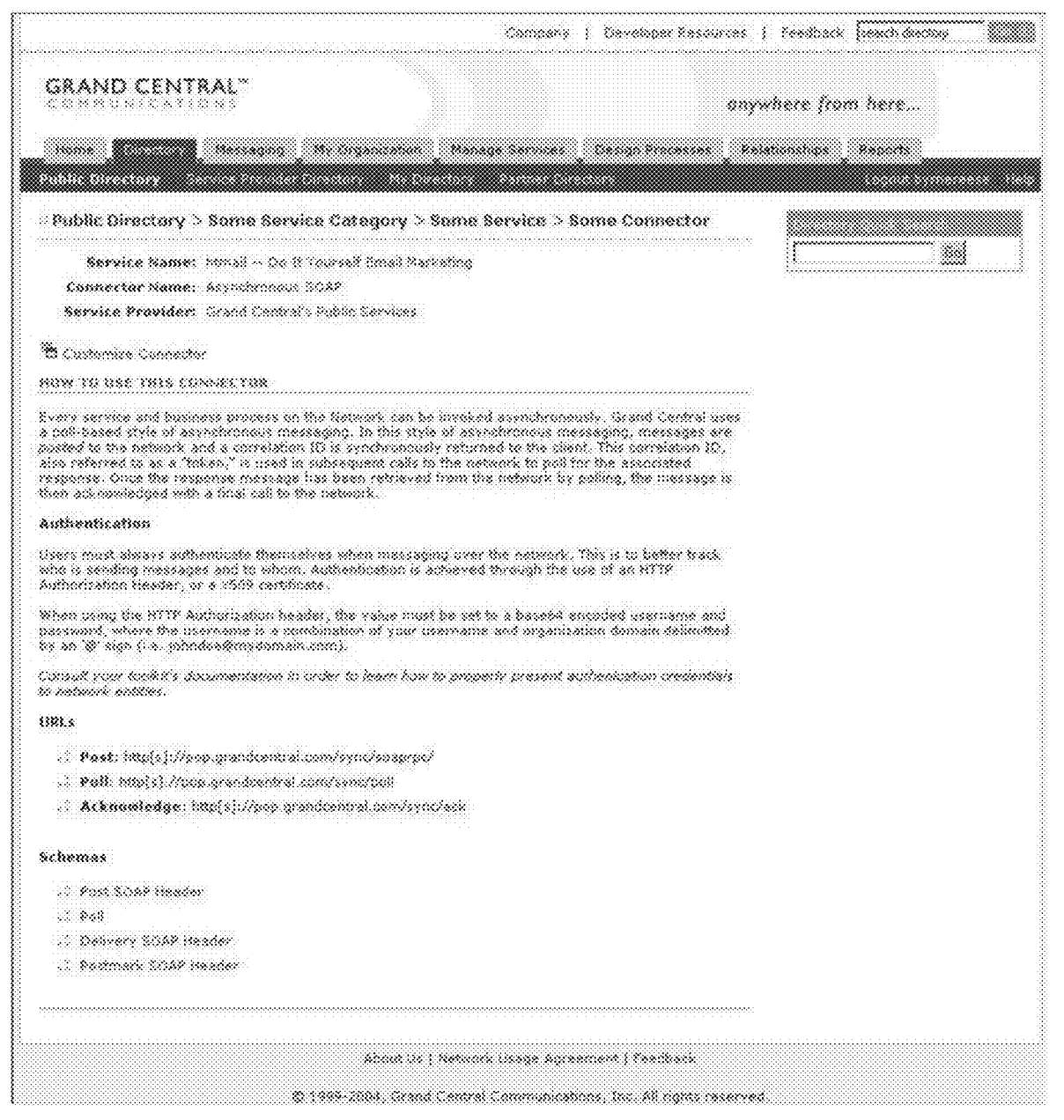

Referring back to FIG. 3, selection of a connector link associated with a particular service (e.g., the Asynchronous SOAP link associated with the htmail service) results in presentation of a connector page such as, for example, the one shown in FIG. 4. The connector page provides specific information about the nature of the connector and how to consume the associated service using the connector. The connector page may provide a set of URLs which address the various interfaces which may be employed to communicate with the connector. The page may also provide links to schemas which are relevant to the connector.

The specific example shown in FIG. 4 describes an asynchronous SOAP connector. It will be understood that the information presented will be different depending upon the connector type. For example, for an FTP connector, an FTP URL, user name and password conventions, directory information, and any necessary command for accessing the directory might be provided. Information might also be provided relating to how documents are transformed via the connector.

In some cases, the connector page may also provide links (not shown) to a set of WSDL files which provide the standard interface definition which typically includes some or all of the data types bound to the service, the URL to connect with to consume the service, security bindings, data bindings, protocol bindings, etc. Developers need only introduce such WSDL files into their programming environment to be able to interact with the connector.

Because the architecture of the services network of the present invention is generally open and shareable, previously created connectors may be employed by developers associated with unrelated end points. For example, where a connector for a particular service which supports the protocol used internally by a developer already exists in the network, all the developer needs to do is to select the connector in the interface of FIG. 3, obtain the information regarding how to consume the service with that connector using the resources provided via the interface of FIG. 4, and configure his development environment accordingly. The service may then be consumed by the members of the developer's organization.

In some cases, a connector might exist which is close to what a particular developer needs to consume the corresponding service, but must be modified in some way to actually enable consumption from that developer's end point. In such a case, the developer can select the link "Customize Connector" in the interface of FIG. 4 to make such modifications. The developer is then given access to a development environment in which the existing connector may be cloned and modified to conform to the developer's specifications.

So, for example, in the example described above of the distributor interacting with the CSV catalog of a manufacturer, different distributors may each employ different XML structures. In such a case, a previously created connector which effects an XML to CSV transformation for a first type of XML structure may be easily and efficiently modified to effect the transformation for a second type of XML structure. Thus, the open and shareable nature of the services network coupled with the ease of discovery of services and the manner in which such services may be consumed can be leveraged to save significant developer resources.

This realization of efficiencies from the developer's point of view may be contrasted with, for example, the approach employed in valued added networks (VANs). That is, the VAN provider will typically charge an enterprise full price for each connector it employs regardless of whether similar or even identical connectors have already been created for other customers. So, even though the VAN provider may realize some efficiency, this is not typically passed on to the customer.

Referring back to the service network of the present invention, there are some cases in which the developer will see the service he wants to consume in the directory, but will not see an appropriate connector listed with that service. In such a case and according to a specific embodiment of the invention, the enhanced directory is operable to facilitate a process by which the developer creates a suitable connector.

According to some embodiments, where a connector is created or customized for a particular service, the provider of that service may be notified and given the option of listing that connector in the directory with their service, and/or binding the connector to its service in some way. For example, a developer associated with a particular enterprise might create a new connector to enable consumption of a service by members of his enterprise. In response to publication of the new connector, an e-mail would be generated to a representative of the provider of the service for which the connector was created. Such an e-mail might notify the service provider of the publication of the new connector and provide a link to the new connector so that it can be reviewed. The service provider can then make decisions regarding the visibility and availability of the new connector relative to its service.

Of course it will be understood that, despite the open nature of the services network, there are some circumstances in which newly created or customized connectors may not be made generally available in the directory. For example, a user might create a connector having no particular utility simply as an exercise. Alternatively, a developer might create a connector that he would like only to be used by members of his enterprise and/or its affiliates and partners. As yet another alternative, a service provider may decide that it doesn't want a particular connector to be associated with its service in the directory, or that it would like to favor the display of some connectors over others. In such cases, services network personnel (possibly with input from the developer or the service provider) may exercise editorial control as to whether and where in the directory a newly created or customized connector might appear. Such editorial control ensures that connectors appearing in the directory are of sufficient quality to be useful to other developers.

It will also be understood that the set of connectors appearing with a service listing in the directory (e.g., in FIG. 3) may not include all of the connectors actually available in the network for that service. Rather, a more complete list of connectors associated with a particular service may appear in some other part of the directory. For example, by selecting a service name link in the interface of FIG. 3 (e.g., the htmail service), a developer can jump to a summary page for the selected service as shown in FIG. 5. The service provider and/or the creator of a particular connector may exercise editorial control over the visibility of particular connectors in various portions of the services directory.

The exemplary service summary page of FIG. 5 provides a list of Service Properties including, for example, a brief description of the service, the address of the service on the network, the relevant directory categories, the homepage of the service provider, any required security policy, etc. The summary page also provides a list of available connectors for the service which may be more comprehensive than the connectors identified in the linking directory page (e.g., FIG. 3). That is, the list of connectors provided on such a summary page will typically identify all of the publicly visible connectors on the network which have been bound to the service. Selection of one of the connector links (e.g., the Asynchronous SOAP link) results in presentation of the appropriate connector page (e.g., the interface of FIG. 4).

According to various embodiments, a set of visibility rules may be associated with each connector in the network which determine whether and where a user might have access to the connector. For example, there may be a set of connectors which are only useful to users associated with a particular enterprise. It would, therefore, not be particularly useful to expose any of those connectors to anyone outside of that organization. Thus, the visibility rules associated with those connectors would result in a different set of connectors on the service summary page for users from the enterprise than those presented to members of the public or other enterprises. Alternatively, and as mentioned above, the provider of a service may exercise editorial control over the visibility rules for any of a variety of purposes. In another example, a service provider may make a connector available for free for an introductory evaluation period (e.g., 30 days), but then automatically restrict access to the connector after the evaluation period until payment is received or some contractual arrangement is made. As will be understood, these are just specific examples of the myriad ways in which the services network may manage access to services on the network. That is, the directory views and access to specific connectors may be controlled to varying levels of granularity (i.e., based on identity, group membership, role, etc.) using the directory capabilities of the services network.

At various points in the services directory or on a service summary page, an "(+) Add Connector" link may be provided by which a developer can begin the process of creating a new connector. This would not typically be available to someone browsing the public directory, but rather to a registered user on the network who would typically be presented with a more individualized or personal version of the directory. An example of such a personalized view is the "My Services" page of FIG. 6.

Figure 6:
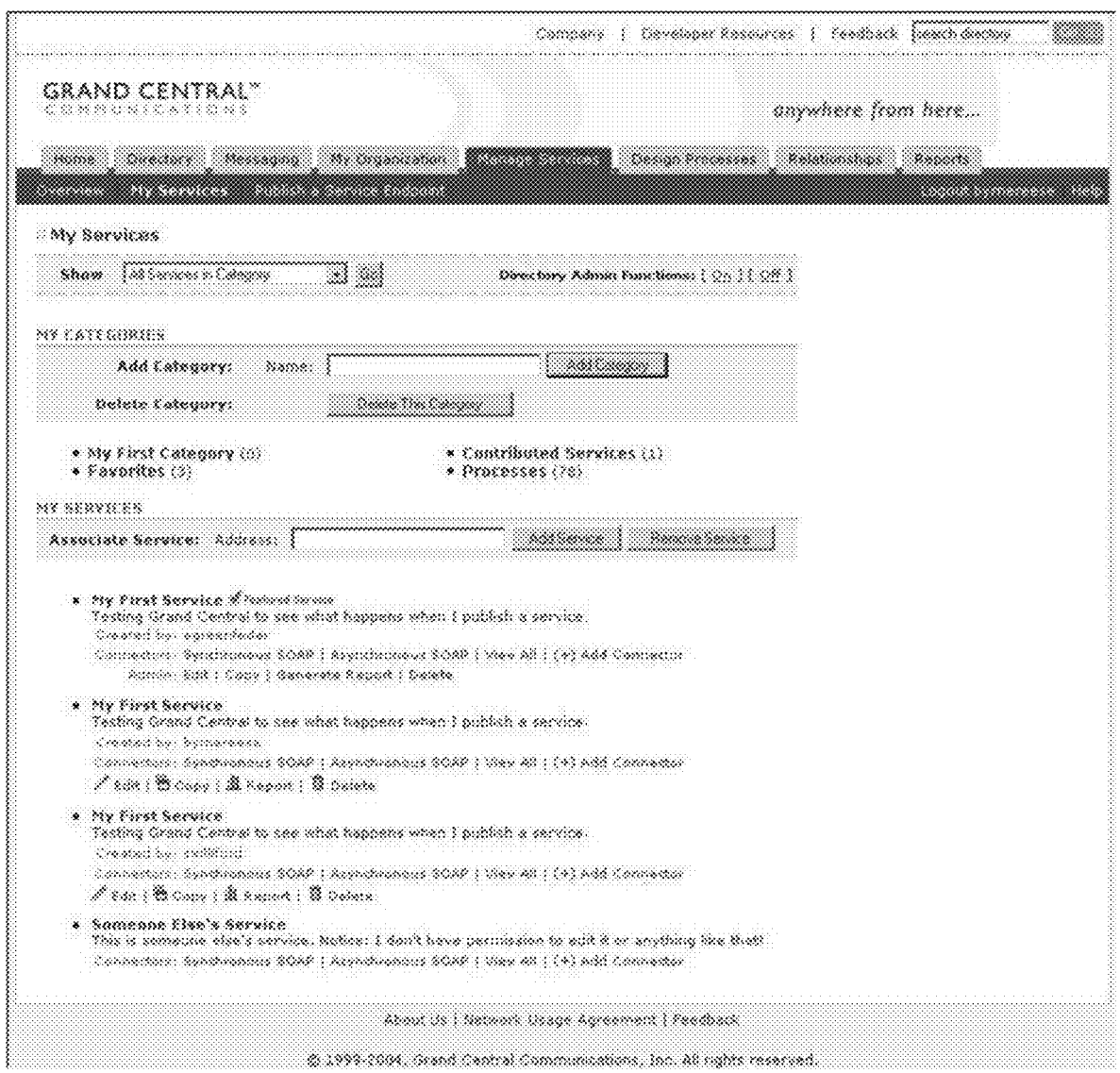

As shown in FIG. 6, various functionalities are provided to the registered user by which further customization of the personal directory may be effected. For example, the user can add or delete categories of services, and create or add services to categories. As with the public view of FIG. 3, the personalized directory view may include a list of services, each listing of which includes at least some of the supported connectors associated with that service. As with the interface of FIG. 3, by selection of the service name link, the user can access the service summary page (e.g., FIG. 5). In contrast with the interface of FIG. 3, the user is also given the option of creating a new connector by selection of the (+) Add Connector link associated with each service.

Selection of the (+) Add Connector link results in presentation of the "Create Connector: Step 1" page of FIG. 7 which begins the process by which a developer can create new inbound and outbound mapping processes and binding them to a service. The developer provides a name for the connector in the Connector Name field. This is the name which will show up in the services directory. The developer also specifies an address to which messages directed to the connector are sent (in the Address field).

The developer can also specify whether others will be allowed to copy the connector using the box associated with the text "Allow others to copy this connector." Selection of this box turns off the "Customize Connector" link on the connector page (e.g., FIG. 4). According to various embodiments, the Create Connector: Step 1 page may include a variety of functionalities by which the developer can define visibility and/or copying privileges for the connector at varying levels of granularity within the context of the services network (e.g., defining which individuals associated with which organizations can either see and/or copy the connector).

The developer also specifies the type of connector by making the appropriate selection in the Connector Type portion of the page. That is, for example, the developer specifies whether the connector follows a request-response messaging paradigm, permits only one-way notifications (e.g., request only), or supports both one and two-way messaging.

In the Create Connector: Step 1 page, the developer can also specify the communication protocol bindings for the connector being created in the Post Interface Binding portion of the page. This selection determines what processes and interface will be employed within the network to mediate the technology differences between the service associated with the connector and consumers of the service using the connector to consume the service. It will be understood that the interface list shown (representing HTTP and FTP interfaces) is merely exemplary and that any of a variety of interface types may be supported and employed to create a connector.

That is, using the "Custom" option in the Post Interface Binding list, the developer can specify the address of a post interface or adapter which is operable to mediate communications using any kind of protocol set, whether standard or proprietary. The address (or URL in this case), which indicates where requests are to be posted in order to communicate with the service network, may be located on the developer's server, hosted by the services network, or hosted by a third party.

Figure 8:
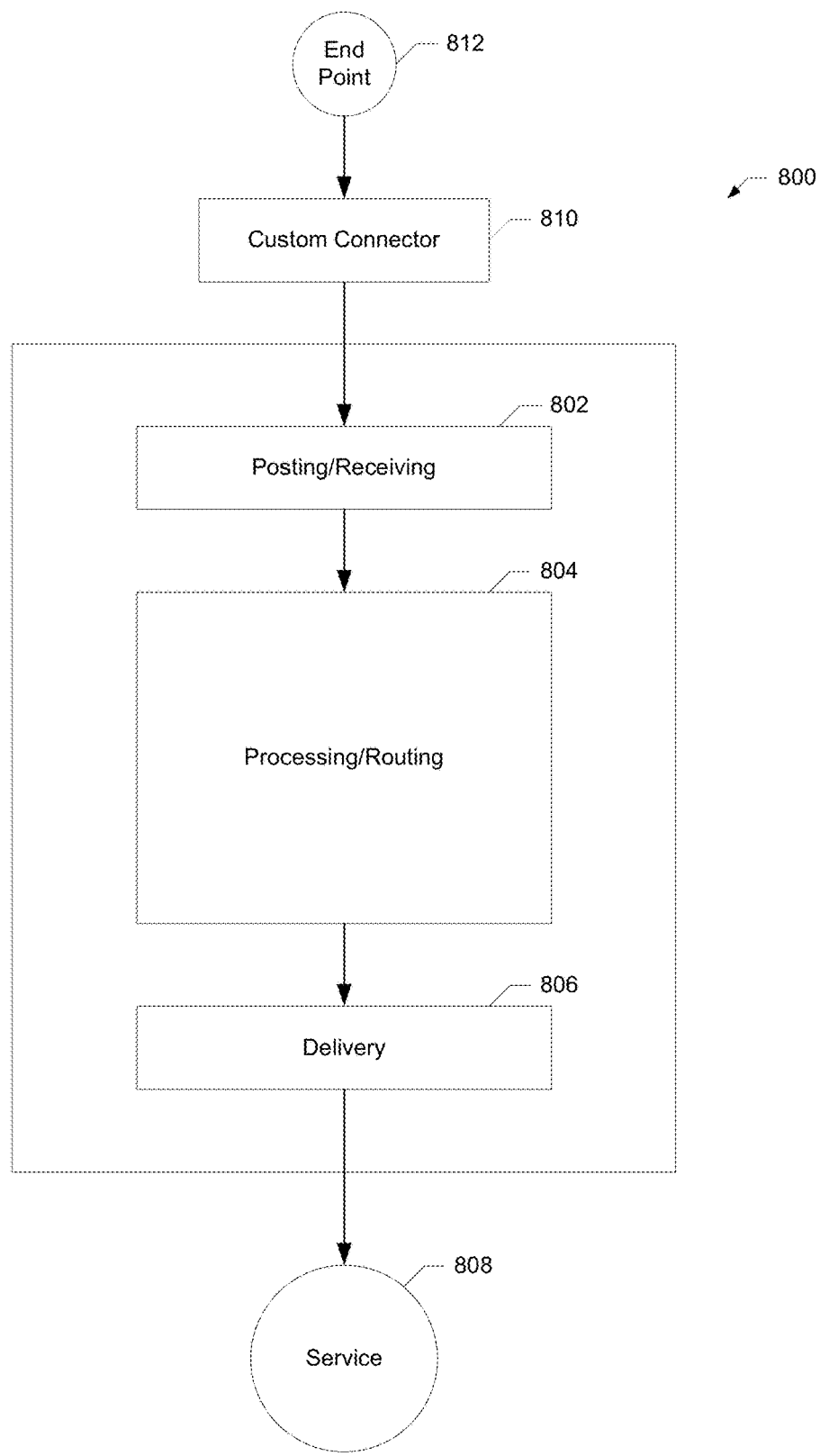
FIG. 8 is a simplified block diagram of a portion of a service network according to embodiments of the invention.

An example of how such an adapter relates to communications between a requester and a service will be described with reference to the block diagram of FIG. 8. In general, message processing in services network 800 may be conceptualized as having three "layers." A posting layer 802 which is operable to receives messages corresponding to a particular protocol set, a processing/routing layer 804 which operates on messages and routes them to the appropriate end points, and a delivery layer 806 which communicates with a particular end point, e.g., service 808, using the protocol set appropriate for that end point. Service 808 can then respond via either of the posting and delivery layers.

According to a specific embodiment, a custom connector 810 is inserted in the messaging process in between posting layer 802 and the end point 812 requiring communication with the network using the custom connector. Custom connector 810 (which may reside on a server associated with end point 812, but may be in network 800 or some intermediate, third-party location) is a process which acts as a proxy to network 800. End point 812 posts messages to connector 810 which performs a mapping from the protocol set associated with the end point to one of the supported posting interfaces on network 800 (i.e., in posting layer 802). Similarly, responses received from the network are mapped by connector 810 to the locally required protocol set.

Figure 7:
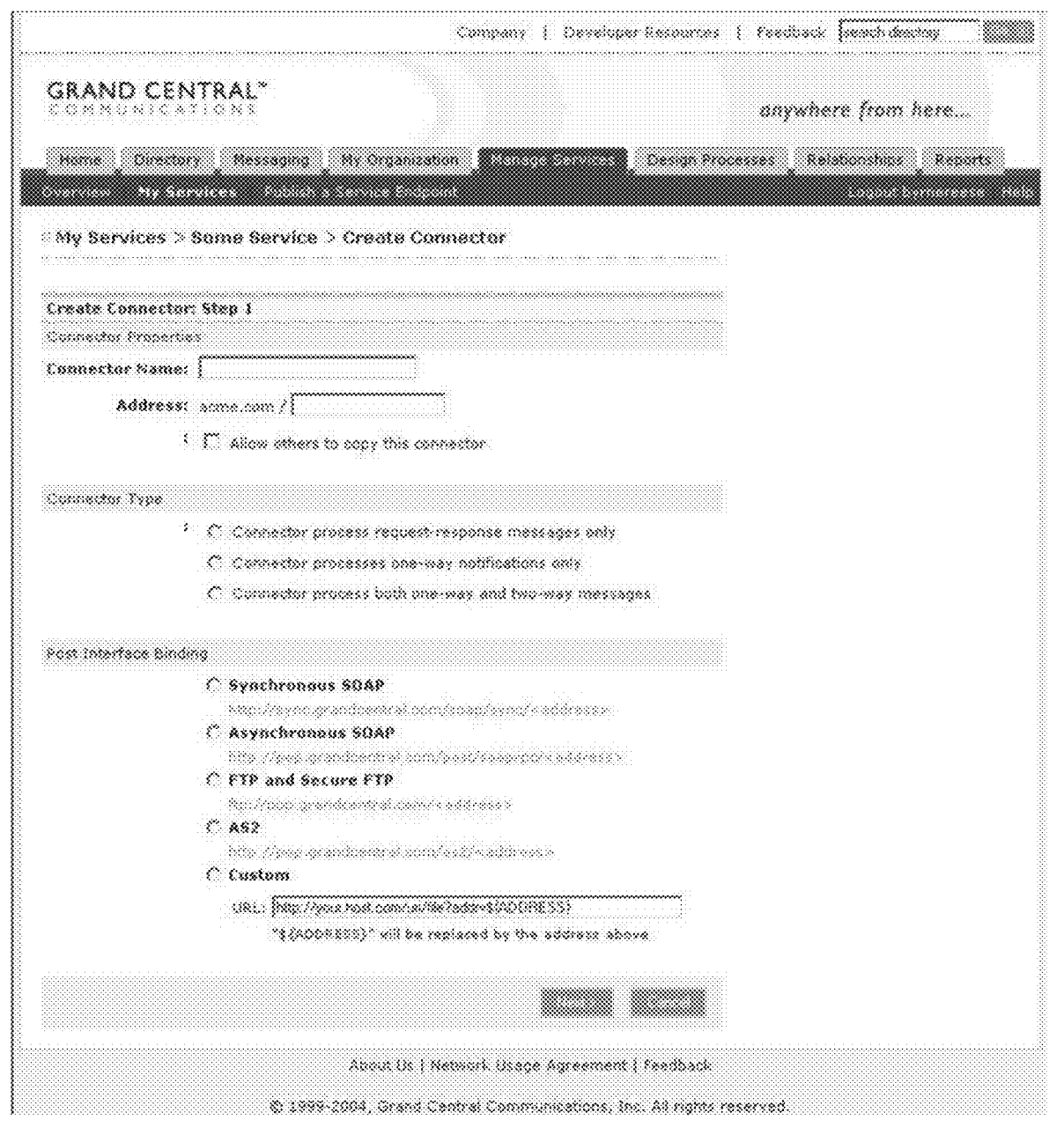

The interface of FIG. 7 may also include a text box (not shown) in which a developer creating a custom connector can provide documentation regarding any necessary specifics to facilitate using the custom connector, e.g., authentication instructions, code samples.

Figure 9:
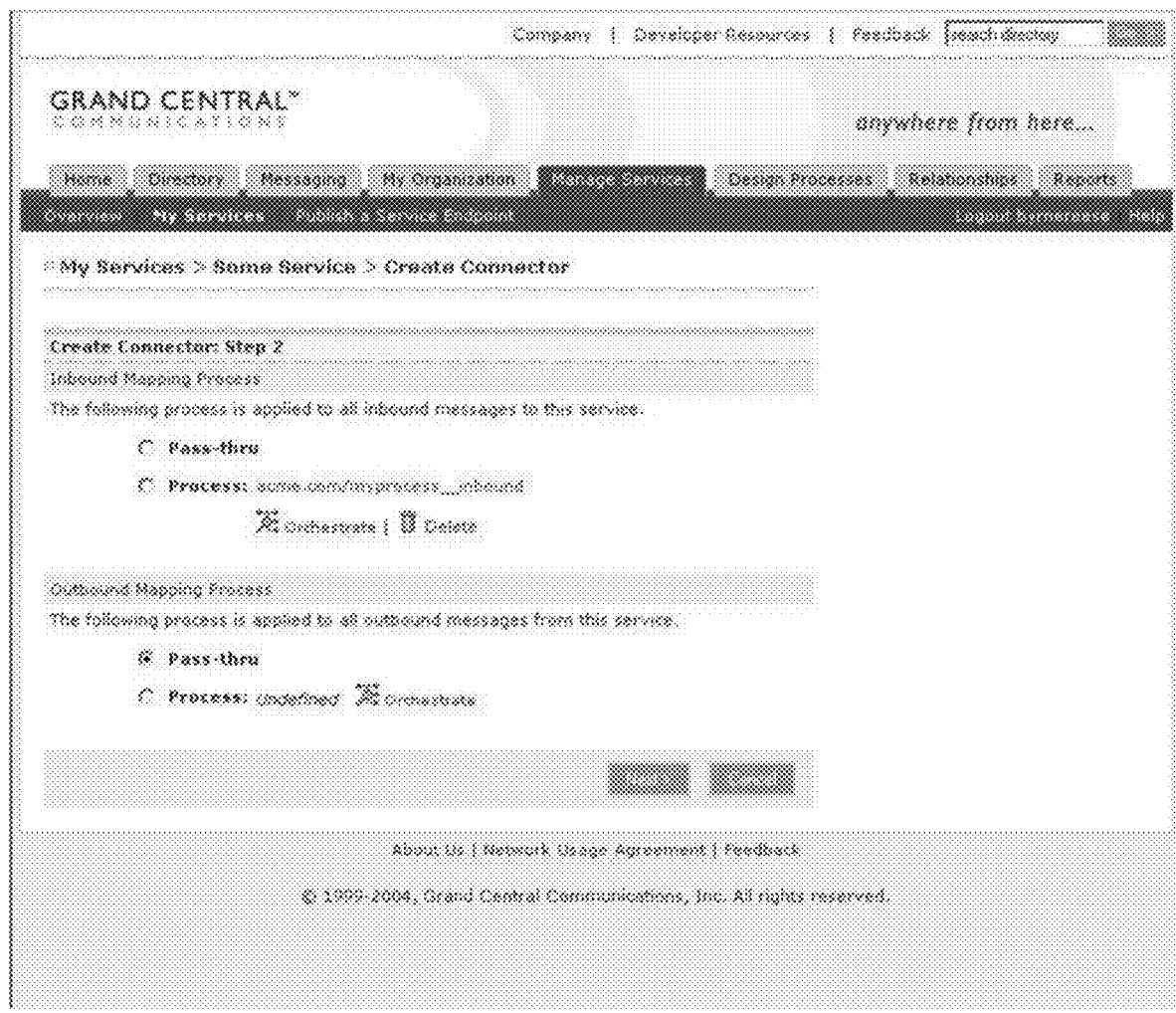

The interface of FIG. 9 illustrates the next step of connector creation in an exemplary "Create Connector: Step 2" page. From this page, the developer can launch a development environment (e.g., by selection of the Process option and the associated "Orchestrate" links) in which the inbound and outbound mapping processes associated with the connector (e.g., processes 202 and 206 of FIG. 2) can be created. An exemplary development environment is shown in FIG. 10.

Notice that the developer has the option of not creating either type of process by selecting the Pass-thru option. This might be useful, for example, where the end points don't have the business process mediation issues described above. It should be noted that where the developer is creating a one-way notification connector, only an inbound mapping process may be created. It should also be noted that the nature of the development or design environment used by the developer to create the mapping processes can vary considerably without departing from the scope of the invention.

Figure 10:
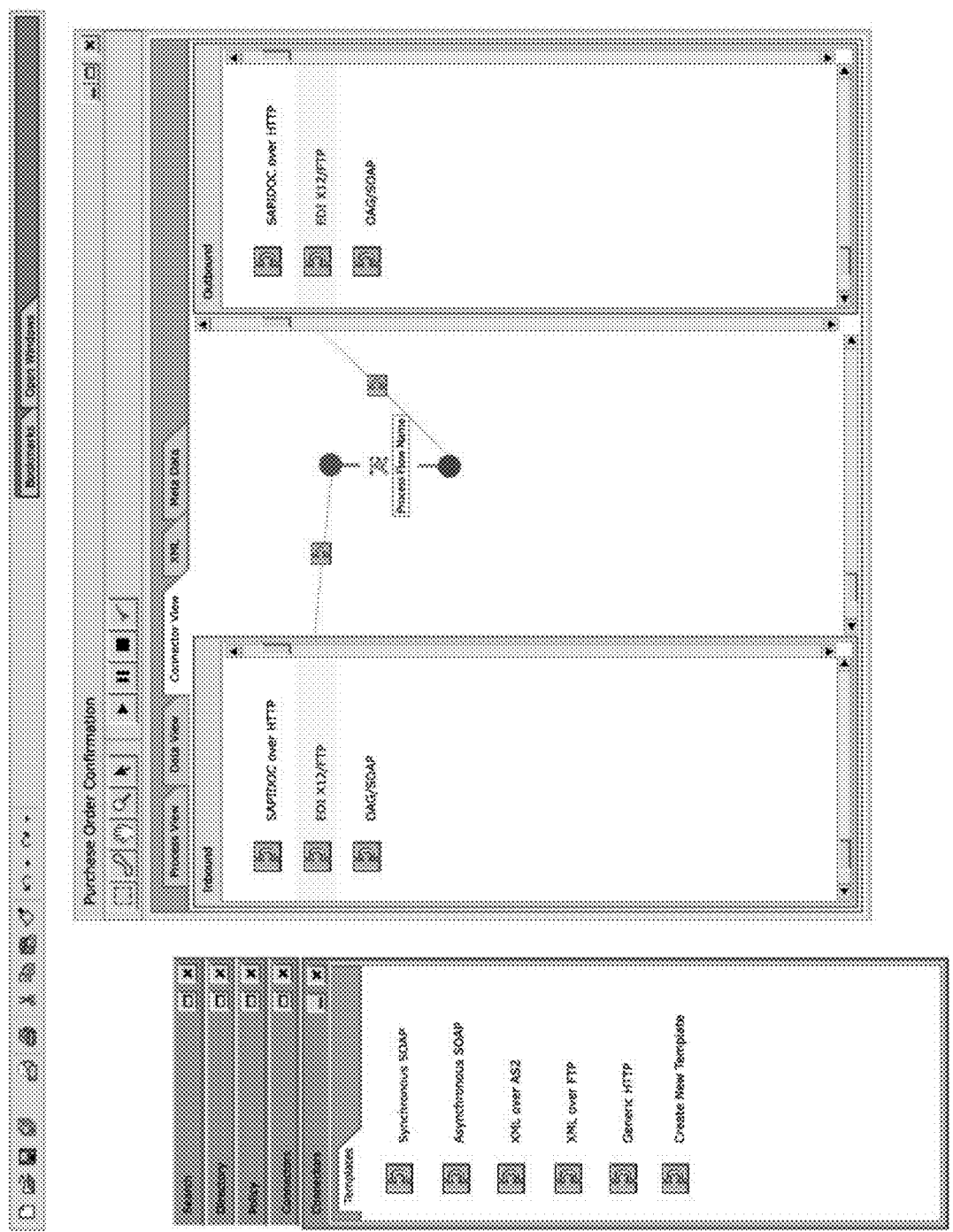

According to a specific embodiment, and as shown in FIG. 10, the network may provide connector templates from which new connectors may be constructed. The appropriate template may be automatically presented to the developer in the connector development environment based on the connector type and protocol specified by the developer. For example, as discussed above with reference to the exemplary interface of FIG. 7, the developer identifies the connector type and the post interface bindings. Using the stored information about the protocol employed by the service for which the connector is intended, the network can select from among a plurality of templates or primitives which facilitate mediation of the underlying technical connectivity issues necessary to achieve data transfer between the two end points. The developer is then presented with the template or primitive on top of which the necessary inbound and/or outbound mapping processes may be constructed.

In contrast to ad hoc solutions provided by traditional integration software providers, the services network of the present invention hosts, executes, monitors, and provides visibility into the processes which enable communication and consumption of services between a wide variety of heterogeneous end points. In addition, the open, shared context in which at least some of these processes operate not only provides visibility to users with respect to the services they are consuming, but also allows them to easily extend and customize previous solutions created by others.

Figure 11:
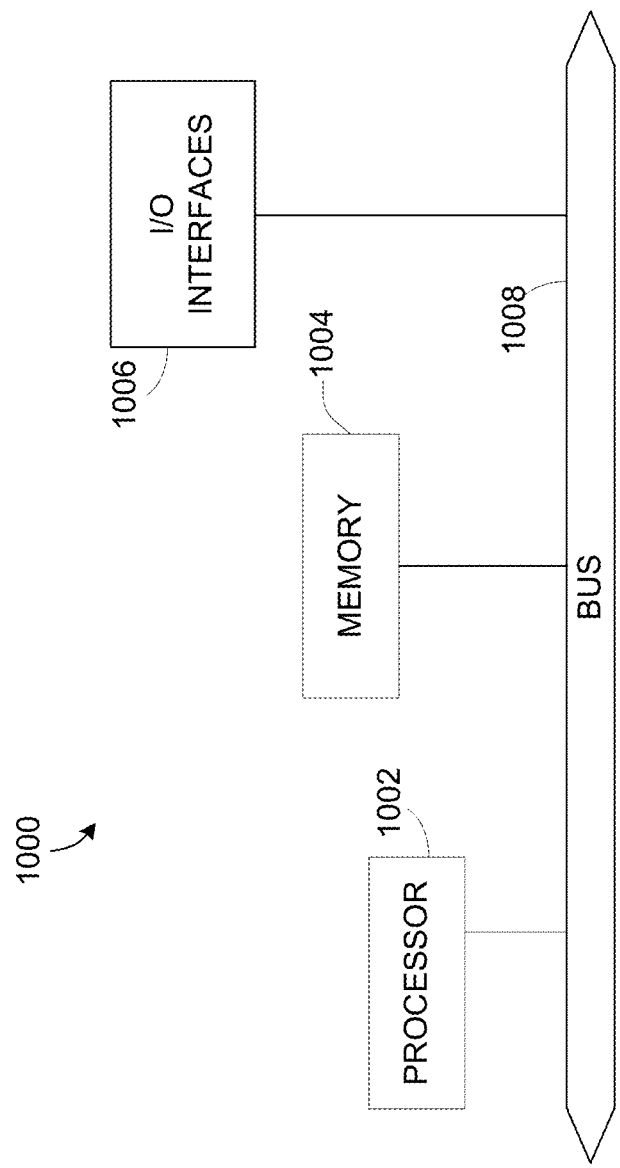
FIG. 11 is a block diagram of a computer system suitable for implementing various aspects of the present invention.

Referring now to FIG. 11, a computer system 1100 suitable for implementing various aspects of the present invention (e.g., server 707 of FIG. 7) includes one or more central processing units (CPUs) 1102, one or more blocks of memory 1104, input and output interfaces 1106, and a bus 1108 (e.g., a PCI bus). Alternatively, computer systems employing point-to-point infrastructures instead of buses may also be employed. When acting under the control of appropriate software or firmware, CPU 1102 is responsible for implementing various portions of the techniques of the present invention. It preferably accomplishes all these functions under the control of software including an operating system and any appropriate applications software. CPU 1102 may include one or more processors. In a specific embodiment, some portion of memory 1104 (such as non-volatile RAM and/or ROM) also forms part of CPU 1102. However, there are many different ways in which memory could be coupled to the system. Memory block 1104 may be used for a variety of purposes such as, for example, caching and/or storing data, program code, etc.

The input and output interfaces 1106 typically provide an interface to various I/O devices, such as mouse, keyboard, display, as well as providing an communication interface with other computer systems over a computer network. Among the communication interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM.

It will be understood that the system shown in FIG. 11 is an exemplary computer system and is by no means the only system architecture on which the various aspects of the present invention can be implemented.

Regardless of system's configuration, it may employ one or more memories or memory modules (such as, for example, memory block 1104) configured to store data, program instructions for the general-purpose network operations and/or the inventive techniques described herein. The program instructions may control the operation of an operating system and/or one or more applications, for example. The memory or memories may also be configured to store information in a repository directory.

Because such information and program instructions may be employed to implement the systems/methods described herein, the present invention also relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

The following examples illustrate some common (although not exhaustive) connector usage scenarios. Examples of connector operation are also provided. It should be understand that these descriptions are merely exemplary and should therefore not be used to limit the scope of the invention.

In a first example, a developer finds the service they wish to consume, and they find a connector entitled "SOAP" associated with that service. Because they utilize a Microsoft .NET framework the developer clicks on the "SOAP" connector. On the connector details page they find the following resources. They are provided a Synchronous WSDL and an Asynchronous WSDL which have certified against the .NET platform (all supported platforms actually). These WSDLs provide the necessary data and protocol bindings to consume the service over the network.

They are also presented with all permissible authentication options and how authentication credentials can be generated for each (HTTP Authorization Header, WS-Security, SAML, etc). They are then asked to select the platform and/or toolkit with which they wish to utilize to consume the service. Once selected, sample client code is presented to the developer which they may use immediately in their environment.

The user is also presented with discreet schema definitions for common messaging elements (post header, delivery header, alerts, etc). Detailed instructions on how to use the resources are also presented. Finally, references to common resources commonly used by developers (e.g., the SOAP specification, links to favorite Web service development web sites, etc.).

In another example, a developer finds the service they wish to consume, and they find a connector entitled "FTP" associated with that service. Because the developer's company used FTP frequently for data exchange between partners the developer clicks on the "FTP" connector. On the connector details page they find the following resources. They are provided with the URL of the FTP server to which they should connect, as well as authentication instructions for the FTP server. They are provided with instructions on how to connect to the FTP server over SSL, also known as "Secure FTP." They are also provided with a list of supported FTP clients and how to download them, as well as with screenshots of one sample FTP client to illustrate how it is configured.

Schemas for the files that will be delivered to the associated service are also provided. This would be useful when the service being connected to is a SOAP service, for which a WSDL has been provided. Individual schema files could be generated for each file that needs to be posted to the service. The connector would then implicitly know how to transform the posted file into a properly formatted SOAP envelope.

Some examples of connector operation will now be provided.

The "native connector" is perhaps one of the most obvious connectors that should exist for a service. A native connector is the connector utilized when the consumer and the producer are configured such that no transformation or mediation is necessary in order for the two parties to exchange data and interoperate. According to one implementation, every service in the directory provisions at least one connector, i.e., its native connector. For example, when a user publishes a SOAP service to the directory, then technically, any SOAP client should immediately be able to send messages to it. The same is true for an AS2 service that is published to the directory, i.e., by default any AS2 client should be able to message with the service immediately. From a user's perspective, the services network appears to be no more than a proxy when invoking the service's native connector.

According to some implementations, the services network is operable to automatically generate a SOAP connector for any service on the network provided that the proper schema files have been provided by the service provider/developer. For example, an FTP service may be published to the network. An FTP connector is provisioned automatically, and if the service provider uploaded a schema for the file format of the file that will be delivered via the FTP connector, then a SOAP connector and WSDL file is inferred from the schema by the network and provided to the service provider's customers.

In the examples mentioned above, it is not necessary that a connector actually be physically created. However, according to a particular embodiment, a connector is still presented to the user in the directory for the purpose of establishing a convention and pattern for learning how to consume services in the directory. One scenario for the automatic creation/registration of a native connector will now be described.

A user logs into the service network with the intent of registering a new service within their organization so that their customers can begin sending messages to it. After logging in, the user immediately goes to the "Manage Services" page. The user then enters a "Publish an Endpoint" wizard. They elect to publish a SOAP service. The user is required to enter a WSDL for the service. They provide the network with all the other necessary information throughout the course of the publish wizard.

At the end of the wizard, the following changes can be observed. The new service can be found listed among the service provider's other services in the Service Provider Directory (assuming of course the proper visibility permissions have been set). The new service will have one connector listed among its supported connectors entitled: "SOAP." The new service's SOAP Connector detail page will contain instructions for consuming that service both synchronously and asynchronously over the services network.

Some more detailed example which delve a little deeper into connector operation follow.

In a first example, a SOAP Connector to an SAP System (release 4.6 or earlier) is described. SAP systems less than and equal to version 4.6 utilize EDI document formats (BAPI) and XML document formats (IDOC) when exchanging data. The HTTP transport protocol is used for both document formats. Thus, a SOAP connector to an SAP system that processes BAPI documents will need to have an inbound mapping process which transforms the SOAP Document into a positional flat file format, and renames message parts and transform the internal message format so that it conforms to the conventions for the BAPI/SAP delivery agent. The SOAP connector will also need to have an outbound mapping process which transforms the input received by the Generic HTTP posting/delivery interface from a positional flat file into a generic XML file format, and uses XSLT to transform the generic XML generated in the previous step into SOAP.

According to a specific embodiment, a delivery agent is a component of the services network that defines specifically how a service or endpoint on the network wishes to receive data. An example of such a delivery agent is a SOAP agent which instructs the network to deliver messages based upon the conventions outlined by the SOAP standard. A service provider could, however, write a custom delivery agent with which the specific protocol is defined by a developer in the form of a script (e.g. JavaScript).

Modern SAP systems (release 4.7 or later) utilize SOAP over HTTP as their primary protocol. As a result, a SOAP connector may not need to be created because the service's native SOAP connector should do the trick. However, just because a service speaks SOAP natively, does not completely obviate the need for additional SOAP connectors for that service. In one scenario, Acme, Inc. would like to use the services network of the present invention to ease the migration from a Seibel CRM system to Salesforce. The customer currently uses Seibel's SOAP interfaces throughout their internal systems and applications. They would like to migrate over to Salesforce's system. The customers just went through a lengthy integration project and cannot afford to retool all of their internal systems to use Salesforce's APIs in lieu of Seibel's.

The services network of the present invention presents a solution to this problem, i.e., a "Seibel SOAP to Salesforce SOAP Connector." This connector accepts messages conformant to Seibel's WSDL definitions and transforms them into SOAP messages compatible with Salesforce's WSDL definitions. This enables Acme Inc. to begin using Salesforce without the need to significantly retool their applications. Virtually all that would be required would be to change the URLs to which the application posts messages.

An FTP to SOAP connector would be bound to the FTP Post interface and would facilitate the delivery of messages to a SOAP endpoint. According to one embodiment, the FTP post interface accepts incoming files and attaches them to an empty SOAP message as follows:

```
Content-type: multipart/related, boundary=AaB03x
--AaB03x
Content-type: text/xml;
<?xml version="1.0"?>
<soap:Envelope xmlns:soap="http://schemas.xmlsoap.org/soap/envelope/"
    xmlns:xsd="http://www.w3.org/2001/XMLSchema"
    xmlns:xsi="http://www.w3.org/2001/XMLSchema-instance">
  <soap:Body />
</soap:Envelope>
--AaB03x
Content-disposition: attachment; filename="file1.xml"
Content-Type: text/xml
<PurchaseOrder xmlns="urn:acme.com/po">
    <partNumber>1234567890</partNumber>
    <quantity>10</quantity>
    <costPerUnit>$99.99</costPerUnit>
    ...
</PurchaseOrder>
--AaB03x--
```

This is the format of the message as it is delivered to the FTP to SOAP connector process.

To facilitate the integration process, the following mapping processes are defined. An inbound mapping process uses XSLT to transform the posted XML into a SOAP message compliant with the recipient service's WSDL.

Given the message above for example, the inbound mapping process may produce a message that looks like the following:

```
<?xml version="1.0"?>
<soap:Envelope
 xmlns:soap="http://schemas.xmlsoap.org/soap/envelope/"
        xmlns:xsd="http://www.w3.org/2001/XMLSchema"
        xmlns:xsi="http://www.w3.org/2001/XMLSchema-
instance">
   <soap:Body >
      <foo:submitPO xmlns:foo="http://some.uri/submitpo">
         <po>
         <partNumber>1234567890</partNumber>
         <quantity>10</quantity>
         <costPerUnit>$99.99</costPerUnit>
         ...
         </po>
      </foo:submitPO>
   </soap:Body>
</soap:Envelope>
```

Because FTP does not inherently support bi-directional data exchange in the form of request-response, an outbound mapping process is not typically necessary. It is conceivable however that an outbound process could be created that could take the SOAP response returned by the Web service being connected to, and post it as a file to a designated directory on an FTP server at the sender's company. Or, the outbound connector could return the response in the form of an e-mail to the organization's administrator.

In another example, eBay currently utilizes a proprietary XML API over HTTP. Thus, a SOAP connector to this interface is provided which accepts a SOAP message and transforms it into a request that looks like this:

```
POST / HTTP/1.1
User-Agent: Mozilla/4.0 (compatible; MSIE 5.01; Windows NT)
Host: api.ebay.com
X-EBAY-METHODNAME: ValidateUserRegistration
X-EBAY-APPID: <hex ID>
X-EBAY-DEBUG: 305
X-EBAY-DEVID: <hex ID>
X-EBAY-CERTID: <hex ID>
Connection: Keep-Alive
<?xml version='1.0' encoding='iso-8859-1'?>
<request>
   <RequestUserId>testID4</RequestUserId>
   <RequestPassword>ult3cat</RequestPassword>
   <Verb>GetSellerTransactions</Verb>
   <DetailLevel>2</DetailLevel>
   <ErrorLevel>1</ErrorLevel>
   <SiteId>0</SiteId>
   <LastModifiedFrom>2001-10-01 19:06:22</LastModifiedFrom>
   <LastModifiedTo>2001-10-10 19:06:22</LastModifiedTo>
   <TransactionsPerPage>10</TransactionsPerPage>
   <PageNumber>1</PageNumber>
</request>
```

Because some parameters to eBay are passed via the HTTP transport layer, the SOAP request message accommodates these parameters. Therefore the posted SOAP message looks something like this:

```
<?xml version="1.0"?>
<soap:Envelope xmlns:soap="http://schemas.xmlsoap.org/soap/envelope/"
        xmlns:xsd="http://www.w3.org/2001/XMLSchema"
        xmlns:xsi="http://www.w3.org/2001/XMLSchema-instance">
   <soap:Body >
      <validateUserRegistration xmlns="http://ebay.grandcentral.com">
         <devId>...</devId>
```
-continued
```
         <appId>...</appId>
         <certId>...</certId>
         <RequestUserId>testID4</RequestUserId>
         <RequestPassword>ult3cat</RequestPassword>
         <Verb>GetSellerTransactions</Verb>
         <DetailLevel>2</DetailLevel>
         <ErrorLevel>1</ErrorLevel>
         <SiteId>0</SiteId>
         <LastModifiedFrom>2001-10-01 19:06:22</LastModifiedFrom>
         <LastModifiedTo>2001-10-10 19:06:22</LastModifiedTo>
         <TransactionsPerPage>10</TransactionsPerPage>
         <PageNumber>1</PageNumber>
      </validateUserRegistration>
   </soap:Body>
</soap:Envelope>
```

The outbound mapping process for this connector performs the same series of transformations, but in reverse.

In the example above, the described connector accepts a SOAP message and posts it to an eBay system utilizing a generic HTTP posting service. However, there could just as easily be the need to support the reverse. For example, imagine that eBay stopped supporting their XML API in favor of a SOAP API. Existing eBay customers would be forced to migrate to the new API and technology which may prove costly or problematic for them. In such a situation, the services network of the present invention provides a connector to which users of eBay's XML API can post messages which the connector maps to eBay's SOAP API. According to one implementation, the services network supports a new posting interface, i.e., a generic HTTP posting interface.

The generic HTTP posting interface can accept any data sent over HTTP. A sample eBay request that looks like this:

```
POST / HTTP/1.1
User-Agent: Mozilla/4.0 (compatible; MSIE 5.01; Windows NT)
Host: api.ebay.com
X-EBAY-METHODNAME: ValidateUserRegistration
X-EBAY-APPID: <hex ID>
X-EBAY-DEBUG: 305
X-EBAY-DEVID: <hex ID>
X-EBAY-CERTID: <hex ID>
Connection: Keep-Alive
Content-type: text/xml
<?xml version='1.0' encoding='iso-8859-1'?>
<request>
   <RequestUserId>testID4</RequestUserId>
   <RequestPassword>ult3cat</RequestPassword>
   <Verb>GetSellerTransactions</Verb>
   <DetailLevel>2</DetailLevel>
   <ErrorLevel>1</ErrorLevel>
   <SiteId>0</SiteId>
   <LastModifiedFrom>2001-10-01 19:06:22</LastModifiedFrom>
   <LastModifiedTo>2001-10-10 19:06:22</LastModifiedTo>
   <TransactionsPerPage>10</TransactionsPerPage>
   <PageNumber>1</PageNumber>
</request>
```

Could get serialized into a SOAP message that looks something like this:

```xml
<?xml version="1.0"?>
<soap:Envelope xmlns:soap="http://schemas.xmlsoap.org/soap/envelope/"
           xmlns:xsd="http://www.w3.org/2001/XMLSchema"
           xmlns:xsi="http://www.w3.org/2001/XMLSchema-instance">
   <soap:Header>
      <gc:httpHeaderData>
         <header>
            <name>User-Agent</name>
            <value>Mozilla/4.0 (compatible; MSIE 5.01; Windows NT)</value>
         </header>
         <header>
            <name>Host</name>
            <value>pop.grandcentral.com</value>
         </header>
         <header>
            <name>X-EBAY-METHODNAME</name>
            <value>...</value>
         </header>
         <header>
            <name> X-EBAY-DEVID</name>
            <value>...</value>
         </header>
         <header>
            <name> X-EBAY-APPID</name>
            <value>...</value>
         </header>
         <header>
            <name> X-EBAY-CERTID</name>
            <value>...</value>
         </header>
         ...
      </gc:httpHeaderData>
   </soap:Header>
   <soap:Body >
      <request>
         <RequestUserId>testID4</RequestUserId>
         <RequestPassword>ult3cat</RequestPassword>
         <Verb>GetSellerTransactions</Verb>
         <DetailLevel>2</DetailLevel>
         <ErrorLevel>1</ErrorLevel>
         <SiteId>0</SiteId>
         <LastModifiedFrom>2001-10-01 19:06:22</LastModifiedFrom>
         <LastModifiedTo>2001-10-10 19:06:22</LastModifiedTo>
         <TransactionsPerPage>10</TransactionsPerPage>
         <PageNumber>1</PageNumber>
      </request>
   </soap:Body>
</soap:Envelope>
```

Once serialized into this format, all the necessary data have been collected for the connector to perform the necessary transformations to eBay's SOAP API.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for mediating user access to services over a network, the method comprising:
   maintaining, by a service network host implemented using a server system comprising a hardware processor, a registry of a plurality of services and a plurality of connectors implemented using circuitry, the plurality of connectors providing access to the plurality of services over the network, the plurality of connectors comprising a first connector configurable to communicate with a first one of the plurality of services using a first format associated with an intermediate document (IDoc) or associated with a business application programming interface (BAPI) to retrieve or modify data associated with the IDoc or a BAPI function call associated with the first service, the first service being configurable, based on an instruction, to receive messages in accordance with a second format, and the first connector being configurable, in accordance with the instruction, to translate the received messages from the second format to the first format; and
   providing, over the network to a computer associated with a user, information for using the first connector to display and/or modify data from the first service, the information comprising an identification of a schema associated with the first connector.

2. The computer-implemented method of claim 1 further comprising:
   providing, over the network to the computer, the data from the first service.

3. The computer-implemented method of claim 1 further comprising:
   controlling visibility of the first connector according to an identity of the user associated with the computer.

4. The computer-implemented method of claim 1 further comprising:
maintaining a policy framework on the computer, the policy framework describing one or more of an access mechanism, an authentication mechanism, or an encryption mechanism associated with use of one or more of the first connector or the first service.

5. The computer-implemented method of claim 1, wherein the first connector comprises an authentication mechanism for accessing the first service.

6. The computer-implemented method of claim 1, wherein the first connector identifies one or more database tables to be accessed in relation to the first service.

7. The computer-implemented method of claim 1, wherein the first service is one of: a web service, a software framework connectivity assembly, or a database.

8. The computer-implemented method of claim 1, wherein the plurality of services employ a plurality of interfaces at least one of which is not directly interoperable with one or more other interfaces.

9. The computer-implemented method of claim 1, wherein the service network host is configured to provide information describing one or more of the plurality of connectors, the information comprising one or more of: use instructions, authentication information, an address of an interface operable to communicate with a connector, a message schema associated with a connector, or a web services description language (WSDL) file associated with a service corresponding to a connector.

10. The computer-implemented method of claim 1 further comprising:
receiving, at the service network host, a request to create a new connector for a second one of the plurality of services using a connector design process, the second service configured to provide access to data associated with the second service;
receiving, at the service network host, an instruction specifying data of the second service or a method for accessing data of the second service using the new connector; and
providing the new connector for use for communicating with the second service.

11. The computer-implemented method of claim 1, wherein the network is configured to provide, using the first connector, a transparent connection to the first service for accessing and manipulating data of the first service.

12. The computer-implemented method of claim 1, wherein one or more of the plurality of connectors is configured to mediate one or more differences in communication protocol or business policy between one or more senders of requests and a corresponding service.

13. The computer-implemented method of claim 12, wherein one or more of the plurality of connectors comprises both an inbound mapping process and an outbound mapping process for mediating the one or more differences in communication protocol or business policy.

14. A computer program product comprising computer-readable program code capable of being executed by one or more processors when retrieved from a non-transitory computer-readable medium, the program code comprising instructions configurable to cause:
maintaining, by a service network host, a registry of a plurality of services and a plurality of connectors implemented using circuitry, the plurality of connectors providing access to the plurality of services over a network, the plurality of connectors comprising a first connector configurable to communicate with a first one of the plurality of services using a first format associated with an intermediate document (IDoc) or associated with a business application programming interface (BAPI) to retrieve or modify data associated with the IDoc or a BAPI function call associated with the first service, the first service being configurable, based on an instruction, to receive messages in accordance with a second format, and the first connector being configurable, in accordance with the instruction, to translate the received messages from the second format to the first format; and
providing, over the network to a computer associated with a user, information for using the first connector to display and/or modify data from the first service, the information comprising an identification of a schema associated with the first connector.

15. The computer program product of claim 14, the instructions further configurable to cause:
receiving, at the service network host, a request to create a new connector for a second one of the plurality of services using a connector design process, the second service configured to provide access to data associated with the second service;
receiving, at the service network host, an instruction specifying data of the second service or a method for accessing data of the second service using the new connector; and
providing the new connector for use for communicating with the second service.

16. The computer program product of claim 14, the instructions further configurable to cause:
maintaining a policy framework on the computer, the policy framework describing one or more of an access mechanism, an authentication mechanism, and an encryption mechanism associated with use of one or more of the first connector or the first service.

17. The computer program product of claim 14, wherein the first service is one of: a web service, a software framework connectivity assembly, or a database.

18. One or more servers for mediating user access to services over a network, the one or more servers comprising:
one or more processors configurable to cause:
maintaining, by a service network host, a registry of a plurality of services and a plurality of connectors implemented using circuitry, the plurality of connectors providing access to the plurality of services over the network, the plurality of connectors comprising a first connector configurable to communicate with a first one of the plurality of services using a first format associated with an intermediate document (IDoc) or associated with a business application programming interface (BAPI) to retrieve or modify data associated with the IDoc or a BAPI function call associated with the first service, the first service being configurable, based on an instruction, to receive messages in accordance with a second format, and the first connector being configurable, in accordance with the instruction, to translate the received messages from the second format to the first format; and
providing, over the network to a computer associated with a user, information for using the first connector to display and/or modify data from the first service, the information comprising an identification of a schema associated with the first connector.

19. The one or more servers of claim 18, the one or more processors further configurable to cause:

processing, at the service network host, a request to create a new connector for a second one of the plurality of services using a connector design process, the second service configured to provide access to data associated with the second service;

processing, at the service network host, an instruction specifying data of the second service or a method for accessing data of the second service using the new connector; and providing the new connector for use for communicating with the second service.

20. The one or more servers of claim 18, the one or more processors further configurable to cause:

maintaining a policy framework on the computer, the policy framework describing one or more of an access mechanism, an authentication mechanism, and an encryption mechanism associated with use of one or more of the first connector or the first service.

* * * * *